US011054255B2

(12) United States Patent
Wu et al.

(10) Patent No.: US 11,054,255 B2
(45) Date of Patent: Jul. 6, 2021

(54) ESTIMATING THE ELEVATION OF A WIRELESS TERMINAL BY DETERMINING A BIAS OF PRESSURE MEASUREMENT FROM A PROBABILITY DISTRIBUTION

(71) Applicant: Polaris Wireless, Inc., Mountain View, CA (US)

(72) Inventors: Jeffrey Noel Wu, Santa Ana, CA (US); Jian Zhu, Tustin, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 243 days.

(21) Appl. No.: 16/419,532

(22) Filed: May 22, 2019

(65) Prior Publication Data
US 2020/0370887 A1 Nov. 26, 2020

(51) Int. Cl.
*G01C 5/06* (2006.01)
*G01C 21/00* (2006.01)

(52) U.S. Cl.
CPC ...................... *G01C 5/06* (2013.01)

(58) Field of Classification Search
CPC ............... G01C 5/06; G01C 21/3826
See application file for complete search history.

(56) References Cited

FOREIGN PATENT DOCUMENTS

WO WO-2019226225 A1 * 11/2019 ............. G01C 25/00

* cited by examiner

*Primary Examiner* — Alexander Satanovsky
*Assistant Examiner* — Mark I Crohn
(74) *Attorney, Agent, or Firm* — McGeary Cukor LLC; Kenneth Ottesen; Jason Paul DeMont

(57) ABSTRACT

A location engine that generates an estimate of the measurement bias of the pressure sensor in a wireless terminal. The estimate is determined from a probability distribution characterized as having a flat top with exponentially decaying sides. The probability distribution is generated by inferring i) a range of elevations within which the wireless terminal is most likely present, wherein the elevations have associated barometric pressures, and ii) a corresponding range of measurement biases based on an inferred range of the barometric pressures. The location engine updates the probability distribution over time. The location engine makes a single estimate of measurement bias available by determining a mean of the updated probability distribution, such as an average of the low and high endpoints that define the flat top. Subsequently, the location engine generates an estimate of the elevation of the wireless terminal by accounting for the estimate of measurement bias.

20 Claims, 18 Drawing Sheets

ESTIMATING THE ELEVATION OF A WIRELESS TERMINAL BY DETERMINING A BIAS OF PRESSURE MEASUREMENT FROM A PROBABILITY DISTRIBUTION

FIELD OF THE INVENTION

The present invention relates to telecommunications in general and, more particularly, to a technique for determining the bias of pressure measurement of a wireless terminal from a probability distribution, and estimating the elevation of the wireless terminal by correcting for the bias.

BACKGROUND OF THE INVENTION

The salient advantage of wireless telecommunications over wireline telecommunications is that the user of the wireless terminal is afforded the opportunity to use his or her terminal anywhere. On the other hand, the salient disadvantage of wireless telecommunications lies in that fact that because the user is mobile, an interested party might not be able to readily ascertain the location of the user.

Such interested parties might include both the user of the wireless terminal and a remote party. There are a variety of reasons why the user of a wireless terminal might be interested in knowing his or her location. For example, the user might be interested in telling a remote party where he or she is or, alternatively, the user might seek advice in navigation.

In addition, there are a variety of reasons why a remote party might be interested in knowing the location of the user. For example, the recipient of an E 9-1-1 emergency call from a wireless terminal might be interested in knowing the location of the wireless terminal so that emergency services vehicles can be dispatched to that location.

There are many techniques in the prior art for estimating the location of a wireless terminal with regard to its latitude and longitude. In accordance with some techniques, the location of a wireless terminal is estimated, at least in part, from signal measurements that are reported by the wireless terminal. The reported measurements are of signals measured by the wireless terminal that are transmitted by one or more base stations and/or by Global Navigation Satellite System (GNSS) satellites, such as Global Positioning System (GPS) satellites. In order for these techniques to work, at least some of the transmitted signals have to be strong enough to allow for accurate measurement by the wireless terminal and for reliable processing by the particular estimation technique. Some of these techniques work well even in environments where the measured strengths of the different signals vary significantly, such as where signal obstructions are present, including natural obstructions such as mountains and artificial obstructions such as buildings.

There are also techniques in the prior art for estimating the elevation of a wireless terminal. Some of these techniques rely on the relationship between barometric pressure, $P_{OBJ}$, and elevation, $Z_{OBJ}$, according to the formula:

$$Z_{OBJ} = -H_{OUT} \cdot \ln\left(\frac{P_{OBJ}}{P_W}\right) + Z_W \quad \text{(Eq. 1)}$$

wherein:

$H_{OUT}$ is the outdoor scale height of the atmosphere, which is the elevation at which the atmospheric pressure has decreased to $e^{-1}$ times its value at mean sea level (e.g., approximately 8400 meters) and is based on outdoor temperature at a pressure station reference.

$P_{OBJ}$ is the relevant measurement of barometric pressure at the elevation of interest, $P_W$ is the measurement of atmospheric pressure at the pressure station reference, and $Z_W$ is the elevation of the pressure station reference.

It is well known in the art how to estimate the elevation of an object using Equation 1. For example, it is well known in the art how to estimate the elevation of a wireless terminal using Equation 1, in which barometric pressure measurements made by the wireless terminal can be used.

In order to determine the elevation of the wireless terminal, however, it is necessary to consider various sources of error, including i) the pressure measurement bias of the wireless terminal's barometric sensor device and ii) the pressure measurement drift of the sensor device.

The pressure measurement bias of the sensor device is typically between 2 and 10 meters in height variation (versus equivalent pressure variation) and can be as much as 40 meters in height variation. The measurement bias can vary across barometric sensor devices of different manufacturers and even across different production batches of the same manufacturer.

The pressure measurement drift of the sensor device is typically between 0 and 5 meters in height equivalent within a month and can be different from one device to another. The drift can be attributed to one or more of the aging of the measuring membrane of the electronic sensor chip, MEMS sensor temperature/humidity cycling, internal IC stresses, and plastic deformation to the sensor. Because of these error sources, the drift (and measurement bias) can vary across wireless terminals of the same model. The drift can also be attributed to temperature and/or humidity considerations in the operating environment of the chip.

As can be seen in Equation 1, an incorrect value of the barometric pressure $P_{OBJ}$ can result in an inaccurate estimate of elevation.

SUMMARY OF THE INVENTION

The present invention enables both the pressure measurement bias of and the drift of a barometric sensor in a wireless terminal to be identified and compensated for, resulting in calibrated pressure measurements and an improved estimate of elevation of the wireless terminal by correcting for the bias. In accordance with the illustrative embodiment of the present invention, a location engine disclosed herein generates an estimate of the measurement bias by first generating a range of possible measurement biases and then constricting the range over time through subsequent, iterative processing.

The range of measurement biases is represented as part of a probability distribution having a flat top with low and high endpoints. Although a uniform distribution with the low and high endpoints might suffice under some operating conditions, the inventors improved on this idea by incorporating exponentially decaying sides that extend from the low and high endpoints to the respective ends of the probability distribution. Thus, the probability distribution of the illustrative embodiment is characterized by four parameters: the low and high endpoints and lower and upper uncertainties, wherein the uncertainties define the average decay lengths of the respective exponential sides. Such a distribution is referred to in this specification as a "low/high distribution."

The location engine of the illustrative embodiment generates a probability distribution of pressure measurement biases based on one or more new measurements that it receives. Such measurements include i) an estimate of the lateral location of a wireless terminal, ii) the uncertainty of the location, iii) measurements of barometric pressure from a pressure reference, such as a pressure station at a nearby airport or weather station, and iv) measurements of barometric pressure from the wireless terminal. With the new measurements, the location engine generates a probability distribution by essentially inferring i) a range of elevations within which the wireless terminal is most likely present, wherein the elevations have associated barometric pressures, and ii) a corresponding range of measurement biases between the low and high endpoints based on an inferred range of the barometric pressures. The location engine makes a single measurement bias estimate available by determining a mean of the probability distribution, such as an average of the low and high endpoints.

The location engine can also update a previously-generated low/high probability distribution, as a function of time, how much the pressure measurement bias has drifted, or something else. If a previously-generated probability distribution is available and is to be updated, the location engine generates an updated probability distribution by combining mathematically i) a probability distribution that is based on one or more of the new measurements, as explained above, and ii) the previously-generated probability distribution. The new-measurement distribution and the previously-generated distribution can be combined, for example, via addition of the logarithmic representations of the two distributions with piecewise-linear fitting to transform the sum of the two distributions back into an approximate linear representation.

There are advantages to using the low/high distribution of the illustrative embodiment and to using a probability distribution in general to determine measurement bias. First, as with a uniform probability distribution, due to its flat top, the low/high probability distribution is robust to the lack of independence between measurements. In particular, processing that involves a distribution with a flat top will not suddenly decrease the uncertainty from a large number of high-uncertainty measurements, as processing involving a Gaussian-like distribution having a peaked top would. Second, unlike the uniform distribution, the low/high distribution elegantly and reasonably handles the case when the interval between the low and high endpoints of the new-measurement probability distribution and the interval between the low and high endpoints of the previously-generated probability distribution do not have a common intersection. And third, using a probability distribution in general provides a basis for determining pressure measurement bias when the elevation of the wireless terminal is presently unavailable or cannot be otherwise inferred.

A first illustrative method of estimating the elevation of a wireless terminal, comprises: receiving, by a data processing system, a first estimate of location of a wireless terminal; receiving, by the data processing system, a first measurement of barometric pressure at the wireless terminal; generating, by the data processing system, data points in a nonempty first set of data points in space based on the first estimate of location of the wireless terminal, wherein the data points correspond to geographical coordinates; generating, by the data processing system, a first probability distribution of pressure measurement bias defined by: (i) a first estimate of bias of barometric pressure measured by the wireless terminal, wherein the first estimate of bias is based on (a) a first data point whose geographical coordinates are at the lowest elevation in the first set of data points, and (b) the first measurement of barometric pressure at the wireless terminal, and (ii) a second estimate of bias of barometric pressure measured by the wireless terminal, wherein the second estimate of bias is based on (a) a second data point whose geographical coordinates are at the highest elevation in the first set of data points, and (b) the first measurement of barometric pressure at the wireless terminal; receiving, by the data processing system, a second measurement of barometric pressure at the wireless terminal; and generating, by the data processing system, an estimate of the elevation of the wireless terminal based on (a) the second measurement of barometric pressure at the wireless terminal, and (b) the first probability distribution of pressure measurement bias.

A second illustrative method of estimating the elevation of a wireless terminal comprises: receiving, by a data processing system, a series of measurements of barometric pressure at the wireless terminal; generating, by the data processing system, a first probability distribution of pressure measurement bias, based on the series of measurements of barometric pressure at the wireless terminal; receiving, by a data processing system, a first estimate of location of a wireless terminal; receiving, by the data processing system, a first measurement of barometric pressure at the wireless terminal; generating, by the data processing system, data points in a nonempty first set of data points in space based on the first estimate of location of the wireless terminal, wherein the data points correspond to geographical coordinates; generating, by the data processing system, a second probability distribution of pressure measurement bias defined by: (i) a first estimate of bias of barometric pressure measured by the wireless terminal, wherein the first estimate of bias is based on (a) a first data point whose geographical coordinates are at the lowest elevation in the first set of data points, and (b) the first measurement of barometric pressure at the wireless terminal, and (ii) a second estimate of bias of barometric pressure measured by the wireless terminal, wherein the second estimate of bias is based on (a) a second data point whose geographical coordinates are at the highest elevation in the first set of data points, and (b) the first measurement of barometric pressure at the wireless terminal; receiving, by the data processing system, a second measurement of barometric pressure at the wireless terminal; and generating, by the data processing system, an estimate of the elevation of the wireless terminal based on (a) the second measurement of barometric pressure at the wireless terminal, (b) the first probability distribution of pressure measurement bias, and (c) the second probability distribution of pressure measurement bias.

A third illustrative method of estimating the elevation of a wireless terminal, the method comprising: receiving, by a data processing system, a first estimate of location of a wireless terminal, the first estimate comprising i) a first geographic coordinate value along a first horizontal dimension and ii) a second geographic coordinate value along a second horizontal dimension; receiving, by the data processing system, a first measurement of barometric pressure at the wireless terminal; generating, by the data processing system, data points in a nonempty first set of data points in space, based on i) a first normal distribution that is defined by the first geographic coordinate value and ii) a second normal distribution that is defined by the second geographic coordinate value, wherein the data points in the first set are represented by coordinate values along the first and second horizontal dimensions; generating, by the data processing system: (i) a first estimate of bias of barometric pressure measured by the wireless terminal, based on (a) a first data point whose geographical coordinates are at the lowest elevation in the first set of data points, and (b) the first measurement of barometric pressure at the wireless terminal, and (ii) a second estimate of bias of barometric pressure measured by the wireless terminal, based on (a) a second data point whose geographical coordinates are at the highest elevation in the first set of data points, and (b) the first measurement of barometric pressure at the wireless terminal; receiving, by the data processing system, a second measurement of barometric pressure at the wireless terminal; and generating, by the data processing system, an estimate of the elevation of the wireless terminal based on (a) the second measurement of barometric pressure at the wireless terminal, (b) the first estimate of bias, and (c) the second estimate of bias.

DEFINITIONS

Figure 1:
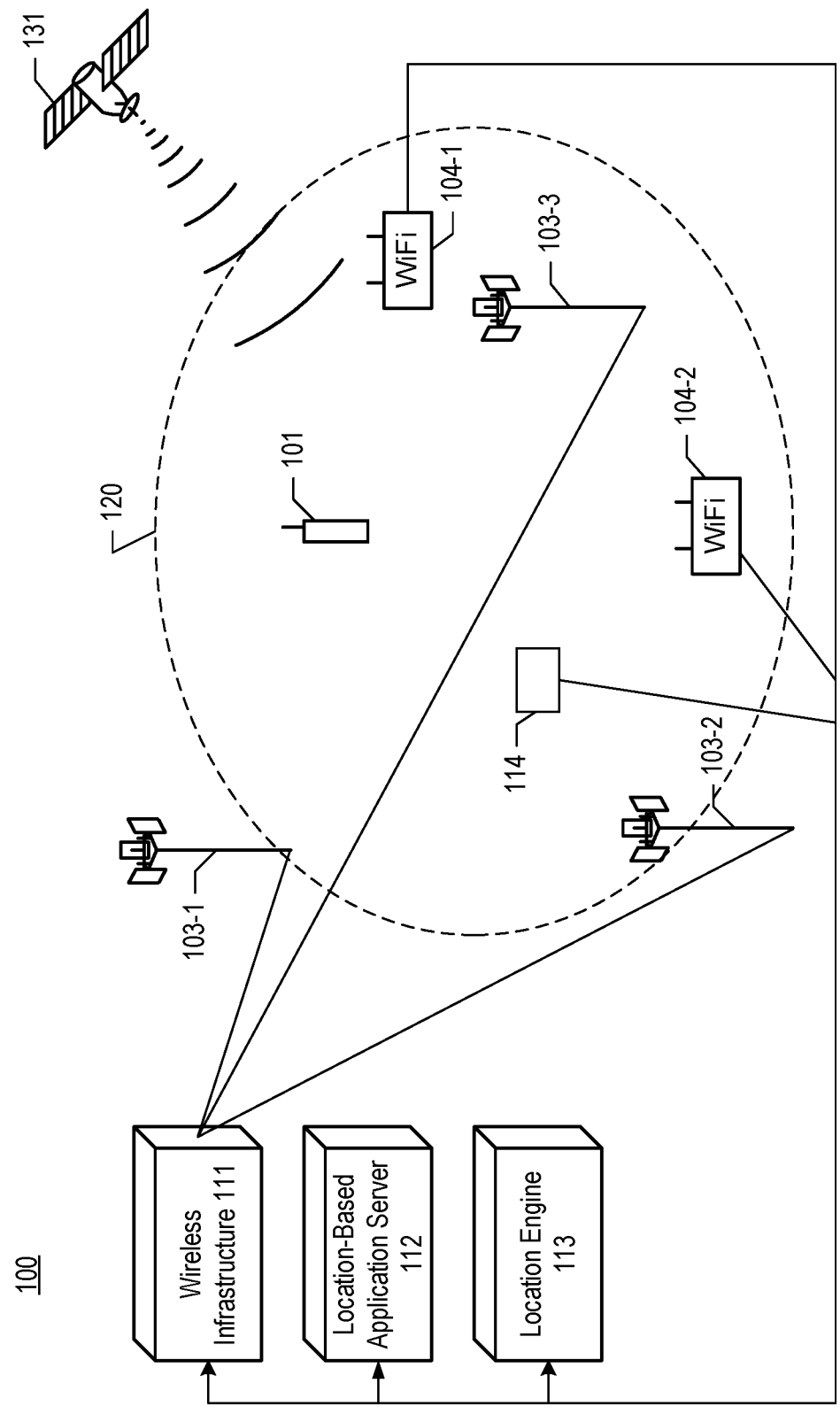
FIG. 1 depicts a diagram of the salient components of telecommunications system 100 in accordance with the illustrative embodiment of the present invention.

Barometric Pressure—For the purposes of this specification, the term "barometric pressure" is defined as a pressure measured by a barometer. This pressure relates to atmospheric pressure, which is the force per unit area exerted on a surface by the weight of the air above that surface in the atmosphere of Earth.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Elevation—For the purposes of this specification, the term "elevation" is defined as the height relative to a reference (e.g., mean sea level, ground level, etc.).

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Height—For the purposes of this specification, the term "height" should be given the ordinary and customary meaning that the term would have to a person of ordinary skill in the art at the time of the invention.

Identity of a Radio Signal—For the purposes of this specification, the phrase "identity of a radio signal" is defined as one or more indicia that distinguish one radio signal from another radio signal.

Lateral Location—For the purposes of this specification, a "lateral location" is defined as information that is probative of latitude or longitude or latitude and longitude.

Location—For the purposes of this specification, the term "location" is defined as a zero-dimensional point, a finite one-dimensional path segment, a finite two-dimensional surface area, or a finite three-dimensional volume.

Outdoor Location—For the purposes of this specification, the term "outdoor location" is defined as a location at which outdoor atmospheric pressure is able to be measured without impediment.

Processor—For the purposes of this specification, a "processor" is defined as hardware or hardware and software that performs mathematical and/or logical operations.

Radio—For the purposes of this specification, a "radio" is defined as hardware or hardware and software that is capable of telecommunications via an unguided (i.e., wireless) radio signal of frequency less than 600 GHz.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless Terminal—For the purposes of this specification, the term "wireless terminal" is defined as a device that is capable of telecommunications without a wire or tangible medium. A wireless terminal can be mobile or immobile. A wireless terminal can transmit or receive or transmit and receive. As is well known to those skilled in the art, a wireless terminal is also commonly called a cell phone, a pager, a wireless transmit/receive unit (WTRU), a user equipment (UE), a mobile station, wireless handset, a fixed or mobile subscriber unit, a pager, a cellular telephone, a personal digital assistant (PDA), an Internet of Things (IoT)

device, a computer, and any other type of device capable of operating in a wireless environment are examples of wireless terminals.

DETAILED DESCRIPTION

Telecommunications System 100—FIG. 1 depicts a diagram of the salient components of telecommunications system 100 in accordance with the illustrative embodiment of the present invention. Telecommunications system 100 comprises: wireless terminal 101, cellular base stations 103-1, 103-2, and 103-3, Wi-Fi base stations 104-1 and 104-2, wireless infrastructure 111, location-based application server 112, location engine 113, airport pressure station 114, and a Global Navigation Satellite System (GNSS) that includes Global Positioning System (GPS) constellation 131, interrelated as shown.

Wireless infrastructure 111, location-based application server 112, location engine 113, and Wi-Fi base stations 104-1 and 104-2 are all connected to one or more interconnected computer networks (e.g., the Internet, a local-area network, a wide-area network, etc.) and, as such, can exchange data in well-known fashion.

Wireless terminal 101 is a device that provides bi-directional voice, data, and video telecommunications services to its user (not shown). Terminal 101 also performs the processes described below and in the accompanying figures, including measuring temperature and barometric pressure, and providing temperature and pressure measurements. Terminal 101 comprises the hardware and software necessary to do the aforementioned tasks. Furthermore, wireless terminal 101 is mobile and can be at any location within geographic region 120 at any time.

Wireless terminal 101 provides the aforementioned telecommunications services to their respective users and perform the aforementioned tasks. It will, however, be clear to those skilled in the art, after reading this disclosure, how to make and use embodiments of the present invention in which wireless terminal 101 provides a different set of services or perform a different set of tasks.

In accordance with the illustrative embodiment, in order to support location estimation, wireless terminal 101 can receive one or more radio signals from each of base stations 103-1, 103-2, and 103-3, Wi-Fi base stations 104-1 and 104-2, and GPS constellation 131, in well-known fashion. Wireless terminal 101 is also capable of identifying each radio signal it receives, in well-known fashion, and of transmitting the identity of each signal it receives to location engine 113. The wireless terminals are further capable of measuring one or more location-dependent traits (e.g., amplitude, phase, etc.) of each radio signal they receive, in well-known fashion, and of transmitting each measurement they generate to location engine 113. As those who are skilled in the art will appreciate after reading this specification, wireless terminal 101 can use and/or support one or more technologies other than WiFi and GPS for estimating the location of the wireless terminal.

In accordance with the illustrative embodiment, wireless terminal 101 can transmit one or more radio signals—that can be received by one or more of base stations 103-1, 103-2, and 103-3 and Wi-Fi base stations 104-1 and 104-2—in accordance with specific parameters (e.g., MAC address, signal strength, frequency, coding, modulation, band, etc.), in well-known fashion, and of transmitting those parameters to location engine 113.

In accordance with the illustrative embodiment, and as described in detail below, wireless terminal 101 comprises a barometer (shown in FIG. 2 as barometer 205). Accordingly, wireless terminal 101 is capable of measuring (e.g., periodically, sporadically, and on-demand) the temperature and barometric pressure, in well-known fashion, and of transmitting the measurements to location engine 113.

Although the illustrative embodiment depicts telecommunications system 100 as comprising one wireless terminal, it will be clear to those skilled in the art, after reading this disclosure, how to make and use alternative embodiments of the present invention that comprise any number of wireless terminals.

Cellular base stations 103-1, 103-2, and 103-3 communicate with wireless infrastructure 111 via wireline or wireless backhaul and with wireless terminal 101 via radio in well-known fashion. As is well known to those skilled in the art, base stations are also commonly referred to by a variety of alternative names such as access points, nodes, network interfaces, etc. Although the illustrative embodiment comprises three cellular base stations, it will be clear to those skilled in the art, after reading this disclosure, how to make and use alternative embodiments of the present invention that comprise any number of cellular base stations.

In accordance with the illustrative embodiment of the present invention, cellular base stations 103-1, 103-2, and 103-3 are terrestrial and immobile, and base station 103-3 is situated within geographic region 120. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 120.

Cellular base stations 103-1, 103-2, and 103-3 comprise the hardware and software necessary to be Long-Term Evolution (LTE) 3GPP-compliant and perform the processes described below and in the accompanying figures. In some alternative embodiments of the present invention, base stations 103-1, 103-2, and 103-3 communicate in accordance with a different cellular standard. Each of cellular base stations 103-1, 103-2, and 103-3 are capable of continually, for example and without limitation:

a. receiving one or more radio signals transmitted by wireless terminal 101, and
b. identifying each radio signal transmitted by wireless terminal 101, in well-known fashion, and of transmitting the identity of those signals to location engine 113, and
c. measuring one or more location-dependent traits of each radio signal transmitted by wireless terminal 101, in well-known fashion, and of transmitting the measurements to location engine 113, and
d. transmitting one or more signals to wireless terminal 101 in accordance with specific parameters (e.g., signal strength, frequency, coding, modulation, etc.), in well-known fashion, and of transmitting those parameters to location engine 113, and
e. broadcasting one or more signals that wireless terminals can use for various purposes (e.g., mobile assisted handoff, location determination, etc.).

It will be clear to those skilled in the art how to make and use cellular base stations 103-1, 103-2, and 103-3.

Wi-Fi base stations 104-1 and 104-2 communicate with wireless terminal 101 via radio in well-known fashion and in accordance with a WiFi protocol. In some alternative embodiments of the present invention, base stations 104-1 and 104-2 communicate in accordance with a different IEEE 802.11 standard or wireless LAN standard entirely. Wi-Fi base stations 104-1 and 104-2 are terrestrial, immobile, and within geographic region 120. Although the illustrative embodiment comprises two Wi-Fi base stations, it will be clear to those skilled in the art, after reading this disclosure, how to make and use alternative embodiments of the present invention that comprise any number of Wi-Fi base stations.

Each of Wi-Fi base stations 104-1 and 104-2 are capable of continually:

a. receiving one or more radio signals transmitted by wireless terminal 101, and b. identifying each radio signal transmitted by wireless terminal 101, in well-known fashion, and of transmitting the identity of those signals to location engine 113, and c. measuring one or more location-dependent traits of each radio signal transmitted by wireless terminal 101, in well-known fashion, and of transmitting the measurements to location engine 113, and d. transmitting one or more signals to wireless terminal 101 in accordance with specific parameters (e.g., signal strength, frequency, coding, modulation, etc.), in well-known fashion, and of transmitting those parameters to location engine 113, and e. broadcasting one or more signals that wireless terminals can use for various purposes (e.g., mobile assisted handoff, location determination, etc.).

It will be clear to those skilled in the art how to make and use Wi-Fi base stations 104-1 and 104-2.

Wireless infrastructure 111 comprises a switch that orchestrates the provisioning of telecommunications service to wireless terminal 101 and the flow of information to and from location engine 113, as described below and in the accompanying figures. As is well known to those skilled in the art, wireless switches are also commonly referred to by other names such as mobile switching centers, mobile telephone switching offices, routers, and so on.

Location-based application server 112 comprises hardware and software that uses the estimate of the location of wireless terminal 101—generated by location engine 113—in a location-based application, in well-known fashion. Location-based applications are well-known in the art and provide services such as without limitation E-911 routing, navigation, location-based advertising, weather alerts. In accordance with the illustrative embodiment, location-based application server 112 is implemented on a data-processing system made up of one or more server computers.

Location engine 113 is a data processing system that comprises hardware and software that generates one or more estimates of the locations of wireless terminal 101 as described below and in the accompanying figures. Location engine 113 maintains one or more databases (e.g., geographic information system [GIS] database, etc.) which are described in detail below. In accordance with the illustrative embodiment, location engine 113 is implemented on a data-processing system made up of one or more server computers. It will be clear to those skilled in the art, after reading this disclosure, how to make and use location engine 113.

Location engine 113 is depicted in FIG. 1 as physically distinct from wireless infrastructure 111. However, it will be clear to those skilled in the art, after reading this disclosure, how to make and use alternative embodiments of the present invention in which location engine 113 is wholly or partially integrated into wireless infrastructure 111.

Airport pressure station 114, which is a first pressure reference, comprises hardware and software that continually measures the outdoor temperature (i.e., provides a measurement of temperature representative of an outdoor location) and measures the atmospheric pressure (i.e., provides a measurement of barometric pressure representative of an outdoor location), in well-known fashion, and transmits those measurements to a central location that is accessible by location engine 113 (e.g., a National Weather Service database, etc.). In measuring temperature and barometric pressure at an outdoor location, airport pressure station 114 is not subject to any stack effect. Station 114 is at a known lateral location in geographic region 120.

In some embodiments of the present invention, airport pressure station 114 provides measurements of temperature and/or barometric pressure representative of a known outdoor location by taking the measurements at a well-ventilated indoor location (e.g., a ventilated shelter, etc.), or by taking pressure measurements at an indoor location at which the pressure is equal to the outdoor pressure at the same elevation.

In accordance with the illustrative embodiment, airport pressure station 114 is situated at an airport (i.e., is on the airport's premises) and serves the airport. In some embodiments of the present invention, station 114 is at a weather-reporting station, while in other embodiments station 114 is at a different type of station (i.e., neither at an airport nor reporting the weather). Although the illustrative embodiment comprises only one airport pressure station, it will be clear to those skilled in the art how to make and use alternative embodiments of the present invention that comprise any number of airport pressure stations.

The illustrative embodiment depicts telecommunications system 100 as comprising one airport pressure station. However, it will be clear to those skilled in the art, after reading this disclosure, how to make and use alternative embodiments of the present invention that comprise any number of airport pressure stations.

Figure 2:
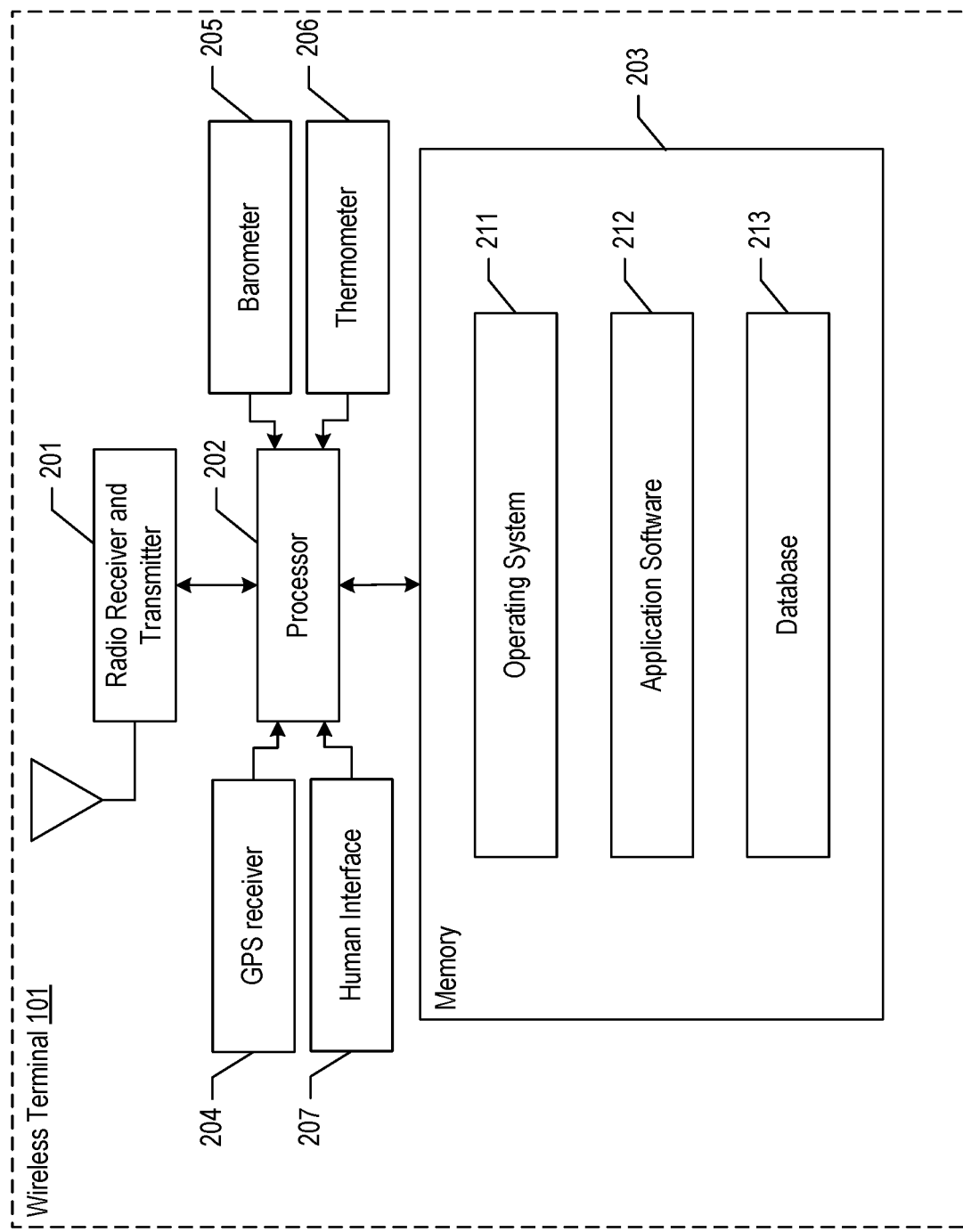
FIG. 2 depicts a block diagram of the salient components of wireless terminal 101 of telecommunications system 100.

Wireless Terminal 101—FIG. 2 depicts a block diagram of the salient components of wireless terminal 101 in accordance with the illustrative embodiment of the present invention. Wireless terminal 101 comprises: radio receiver and transmitter 201, processor 202, memory 203, GPS receiver 204, barometer 205, and human interface 207, interconnected as shown. The block diagram depicted in FIG. 2 can also be considered representative of other wireless terminals.

Radio receiver and transmitter component 201 comprises hardware and software that enables wireless terminal 101 to receive (and analyze) radio signals and to transmit radio signals. In accordance with the illustrative embodiment, wireless telecommunications service is provided to wireless terminal 101 in accordance with both the Long-Term Evolution (LTE) 4G air-interface standard of the $3^{rd}$ Generation Partnership Project ("3GPP") and the WiFi standard. After reading this disclosure, however, it will be clear to those skilled in the art how to make and use alternative embodiments of the present invention that operate in accordance with one or more other air-interface standards (e.g., a 5G or other standard under development, a different 4G standard, Global System Mobile "GSM," UMTS, CDMA-2000, IS-136 TDMA, IS-95 CDMA, 3G Wideband CDMA, other IEEE 802.11 or wireless LAN standard, 802.16 WiMax, Bluetooth, etc.) in one or more frequency bands. It will be clear to those skilled in the art how to make and use radio receiver and transmitter 201.

Processor 202 is hardware under the command of software stored in memory 203 that performs all of the relevant functions described below and in the accompanying figures. It will be clear to those skilled in the art how to make and use processor 202.

Memory 203 is a non-transitory, non-volatile random-access memory that holds all of the programming and data required for the operation of wireless terminal 101, and includes operating system 211, application software 212, and database 213. It will be clear to those skilled in the art how to make and use memory 203.

GPS receiver 204 is hardware and software that enables wireless terminal 101 to determine its own location. GPS receiver 204 interacts with GPS satellites in constellation 131. It will be clear to those skilled in the art how to make and use GPS receiver 204.

Barometer 205 is a barometric sensor device and typically comprises a hardware MEMS sensor that measures the atmospheric pressure at wireless terminal 101, thereby providing barometric pressure measurements. In accordance with the illustrative embodiment, barometer 205 comprises the LSP331AP MEMS pressure sensor from ST Microelectronics and/or the Bosch BMP280 sensor, but it will be clear those skilled in the art, after reading this disclosure, how to make and use alternative embodiments of the present invention that use a different sensor to measure the atmospheric pressure.

Thermometer 206 is a hardware temperature sensor that measures the ambient temperature at wireless terminal 101. In accordance with the illustrative embodiment, thermometer 206 comprises the Bosch BMP280 sensor, which also measures temperature in addition to pressure, but it will be clear to those skilled in the art, after reading this disclosure, how to make and use alternative embodiments of the present invention that use a different sensor to measure the ambient temperature at wireless terminal 101. For example, the ADT7420 temperature sensor from Analog Devices is capable of measuring temperature. In some embodiments of the present invention, wireless terminal 101 has no thermometer, in which case the system disclosed herein can determine indoor temperature through other means as described below.

Human interface 207 is hardware and software that enables a person to interact with wireless terminal 101. Human interface 207 comprises a display, keypad, microphone, and speaker. It will be clear to those skilled in the art how to make and use human interface 207.

Wireless terminal 101 can perform at least some of the processes described below and in the accompanying figures. For example and without limitation, wireless terminal 101 is capable of:

a. receiving one or more radio signals transmitted by cellular base stations 103-1, 103-2, and 103-3, Wi-Fi base stations 104-1 and 104-2, and GPS constellation 131, and b. identifying each radio signal transmitted by cellular base stations 103-1, 103-2, and 103-3, Wi-Fi base stations 104-1 and 104-2, and GPS constellation 131, in well-known fashion, and of transmitting the identity of those signals, or information related to the identity of those signals, to location engine 113, and c. measuring one or more location-dependent traits of each radio signal transmitted by cellular base stations 103-1, 103-2, and 103-3, Wi-Fi base stations 104-1 and 104-2, and GPS constellation 131, in well-known fashion, and of transmitting the measurements to location engine 113, and d. transmitting one or more signals to cellular base stations 103-1, 103-2, and 103-3, Wi-Fi base stations 104-1 and 104-2 in accordance with specific parameters (e.g., signal strength, frequency, coding, modulation, etc.), in well-known fashion, and of transmitting those parameters to location engine 113, and e. measuring the temperature and barometric pressure at wireless terminal 101, in well-known fashion, and transmitting those measurements to location engine 113. In some embodiments of the present invention, wireless terminal can measure the temperature at wireless terminal 101, in well-known fashion, and transmit those measurements to location engine 113.

It will be clear to those skilled in the art how to make and use wireless terminal 101.

Figure 3:
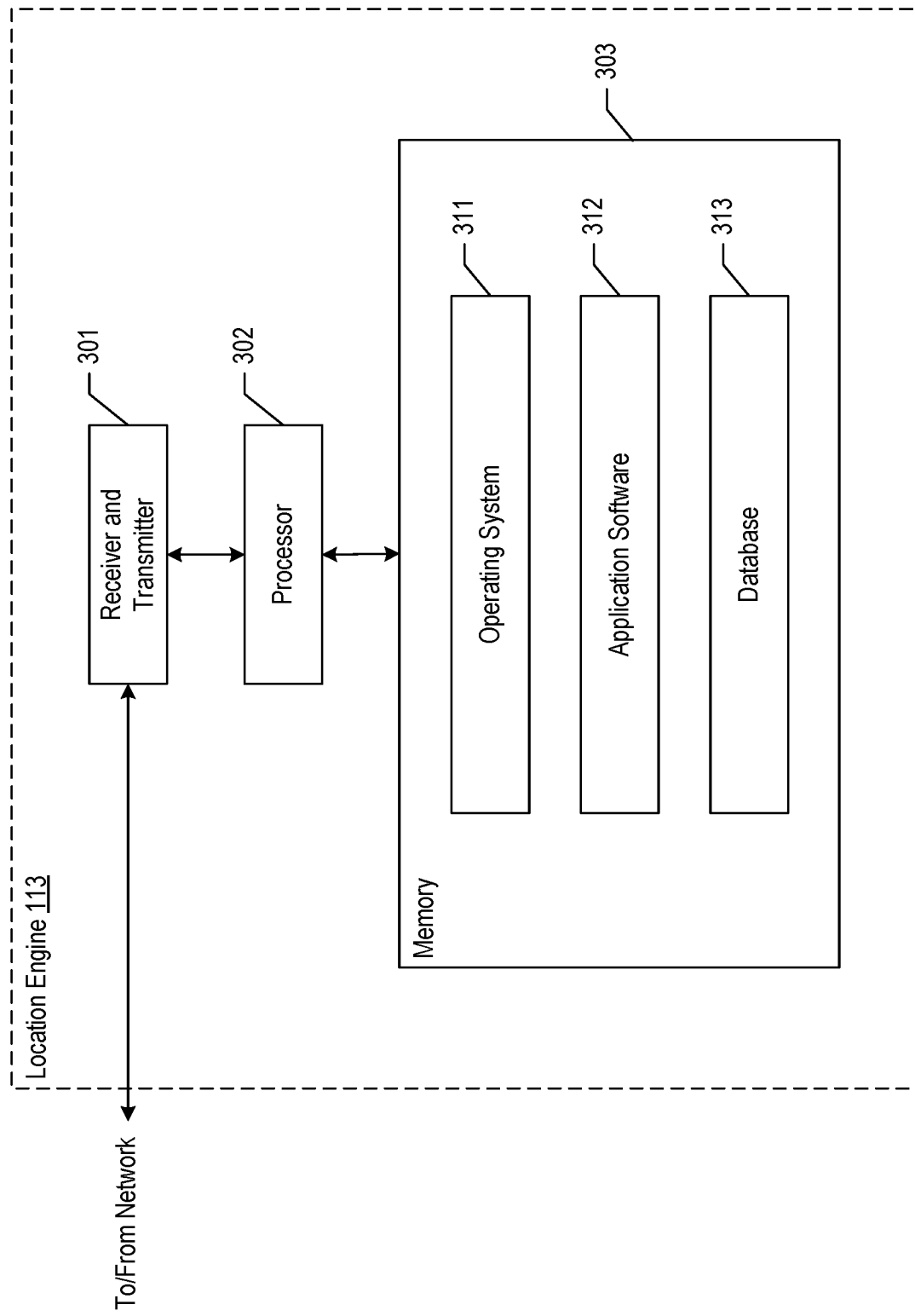
FIG. 3 depicts a block diagram of the salient components of location engine 113 of telecommunications system 100.

Location engine 113—FIG. 3 depicts a block diagram of the salient components of location engine 113 in accordance with the illustrative embodiment. Location engine 113 comprises: receiver and transmitter 301, processor 302, and memory 303, which are interconnected as shown.

Receiver and transmitter component 301 enables location engine 113 to transmit to and receive from wireless terminal 101, wireless infrastructure 111, location-based application server 112, and airport pressure station 114. It will be clear to those skilled in the art how to make and use receiver and transmitter 301.

Processor 302 is a general-purpose processor that can execute an operating system, the application software that performs operations 401 through 411 (described herein and shown in FIG. 4), and of populating, amending, using, and managing a GIS database, as described in detail below and in the accompanying figures. It will be clear to those skilled in the art how to make and use processor 302.

In general, the GIS database contains information for geographic region 120, including without limitation, the physical characteristics of all of the structures in geographic region 120. It will be clear to those skilled in the art, after reading this specification, how to make and use the GIS database.

Memory 303 is a non-transitory, non-volatile memory that stores:

a. operating system 311, and
b. application software 312, and
c. the GIS database in database 313.

In some embodiments of the present invention, memory 303 is in the form of cloud storage or network storage. In any event, it will be clear to those skilled in the art how to make and use memory 303.

Figure 4:
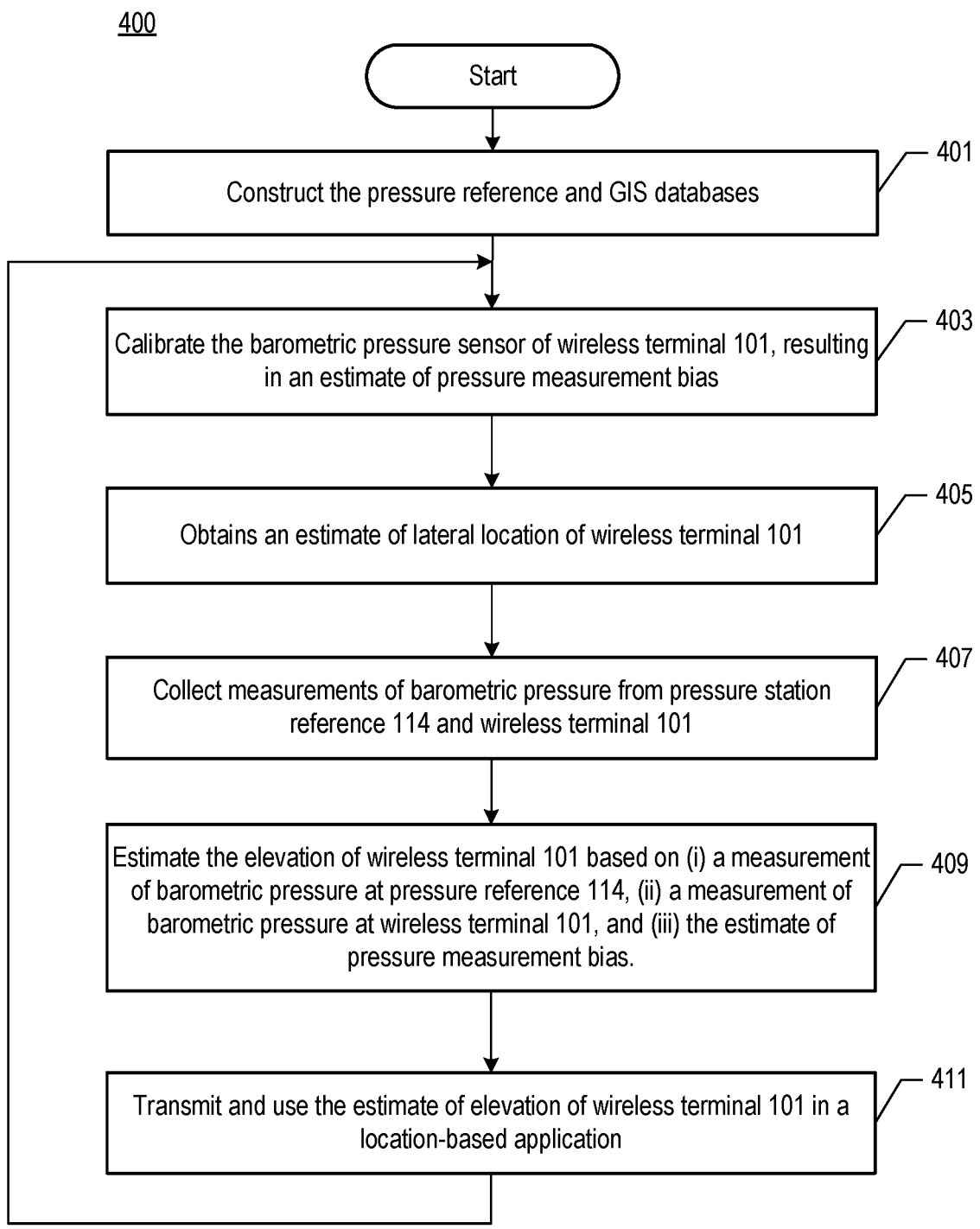
FIG. 4 depicts a flowchart of the salient processes performed as part of method 400 in accordance with the illustrative embodiment of the present invention.

Operation of the Illustrative Embodiment—FIG. 4 depicts a flowchart of the salient processes performed as part of method 400 in accordance with the illustrative embodiment of the present invention. It will be clear to those having ordinary skill in the art, after reading the present disclosure, how to make and use alternative embodiments of method 400, as well as the other methods disclosed in this specification, wherein the recited operations sub-operations, and messages are differently sequenced, grouped, or sub-divided—all within the scope of the present disclosure. It will also be clear to those skilled in the art, after reading the present disclosure, how to make and use alternative embodiments of the disclosed methods wherein some of the described operations, sub-operations, and messages are optional, or are omitted.

It will also be clear to those skilled in the art, after reading the present disclosure, how to make and use alternative embodiments of the disclosed methods wherein some of the disclosed operations are performed by other elements and/or systems. For example and without limitation, at least some of the operations disclosed as being performed by location engine 113 can be performed by one or more wireless terminals (e.g., terminal 101, etc.).

In accordance with operation 401, the GIS database is initialized and stored in memory 303 of location engine 113. Operation 401 is described in detail below and in regard to FIG. 5.

In accordance with operation 403, location engine 113 calibrates the barometric pressure sensor of wireless terminal 101, resulting in an estimate of the measurement bias of the sensor. Operation 403 is described below and in regard to FIG. 9.

In accordance with operation 405, location engine 113 obtains an estimate of the lateral location of wireless terminal 101, as generated by wireless terminal 101 (e.g., via Global Navigation Satellite System [GNSS], GPS, etc.). In some embodiments of the present invention, location engine 113 itself generates an estimate of the lateral location of wireless terminal 101, with or without the lateral location provided by wireless terminal 101 being used, based on:

a. the location-dependent information conveyed by a radio signal exchanged between a base station (e.g., cellular base station 103-*i*, Wi-Fi base station 104-*j*, etc.) and wireless terminal 101 (e.g., the empirical data for received radio signals, etc.), and b. a location-trait database, in well-known fashion.

As those who are skilled in the art will appreciate after reading this specification, in some other alternative embodiments the lateral location can be determined using a different technique than those described above (e.g., WiFi, Bluetooth, OTDOA, etc.). Moreover, as those who are skilled in the art will appreciate after reading this specification, more than one technique can be combined in order to determine the lateral location, in some embodiments of the present invention.

In accordance with operation 407, location engine 113 collects measurements of barometric pressure from airport pressure station 114 (i.e., either directly or indirectly) and wireless terminal 101. In some embodiments of the present invention, location engine 113 collects measurements of barometric pressure from other airport pressure stations as well, or from other wireless terminals as well, or both. In some embodiments of the present invention, location engine 113 can also collect measurements of temperature. Operation 407 is described in detail below and in regard to FIG. 17.

In accordance with operation 409, location engine 113 generates an estimate of the elevation of wireless terminal 101 based on:

a. the estimate of lateral location of wireless terminal 101 received or generated in accordance with operation 405, b. a measurement of barometric pressure at pressure reference 114 obtained in accordance with operation 407, c. a measurement of barometric pressure at wireless terminal 101 obtained in accordance with operation 407, and d. an estimate of bias obtained in accordance with operation 403.

Figure 18:
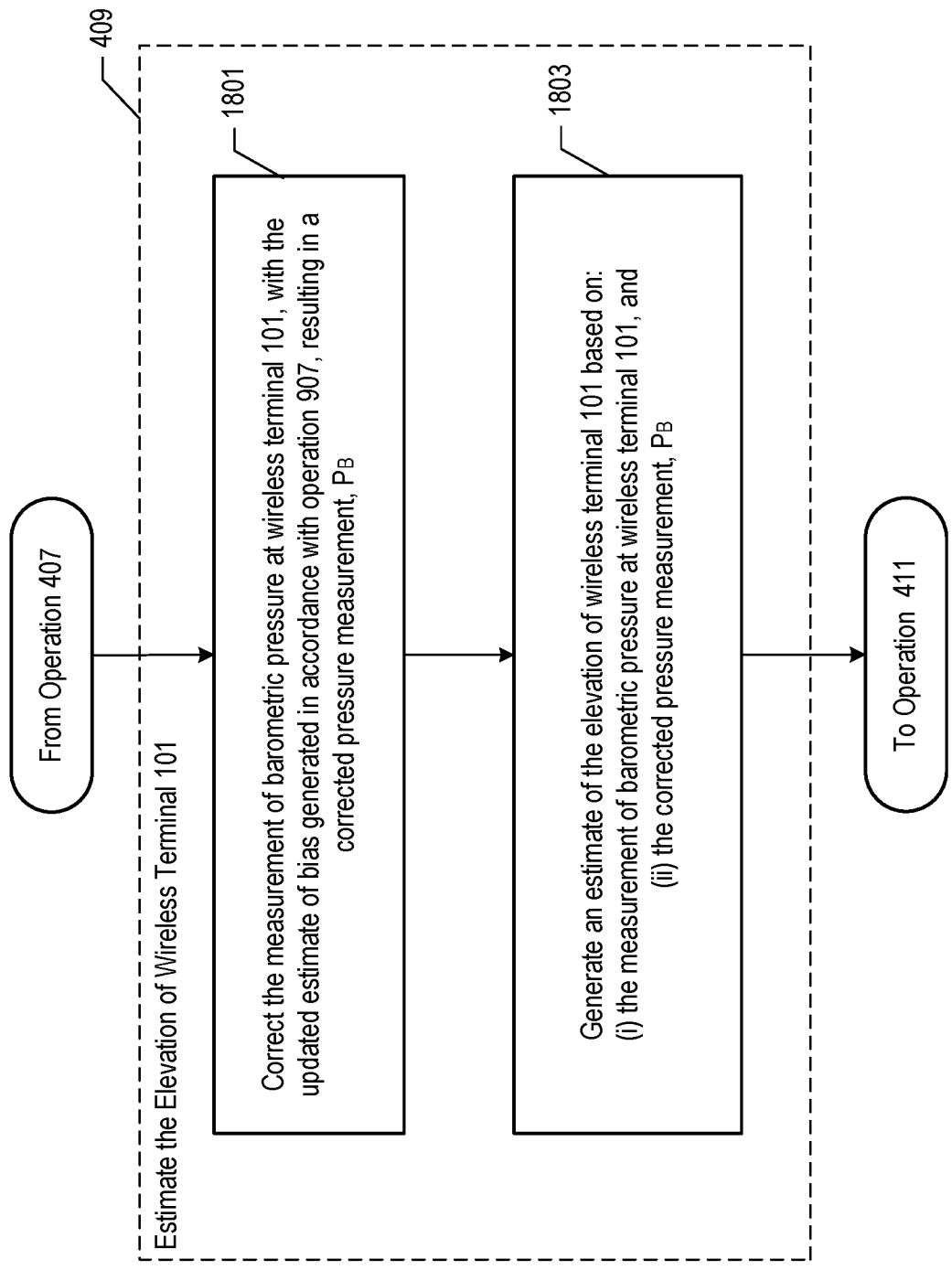
FIG. 18 depicts a flowchart of the salient processes performed in accordance with operation 409.

Operation 409 is described in detail below and in regard to FIG. 18.

In accordance with operation 411, location engine 113 transmits:

a. the estimate of the lateral location of wireless terminal 101 generated in accordance with operation 405, and/or b. the estimate of the elevation of wireless terminal 101 generated in accordance with operation 409, and/or c. the estimate of the measurement bias of wireless terminal 101 generated in accordance with operation 403, and/or d. one or more defining characteristics of the new-measurement distribution generated in accordance with operation 1001, and/or e. one or more defining characteristics of the updated probability distribution generated in accordance with operation 1005, and/or f. any other information used to determine the lateral location, estimate of elevation, and/or measurement bias, to location-based application server 112 and/or to wireless terminal 101 for use in a location-based application and/or to yet another data-processing system (e.g., server computer, wireless terminal, etc.).

In some embodiments of the present invention, location engine 113 displays (e.g., on a display, etc.) information related to the estimate of lateral location and/or estimate of elevation, instead of or in addition to transmitting them. In any event, it will be clear to those skilled in the art how to make and use embodiments of the present invention that perform operation 411.

After operation 411 is completed, control passes back to operation 403.

Figure 5:
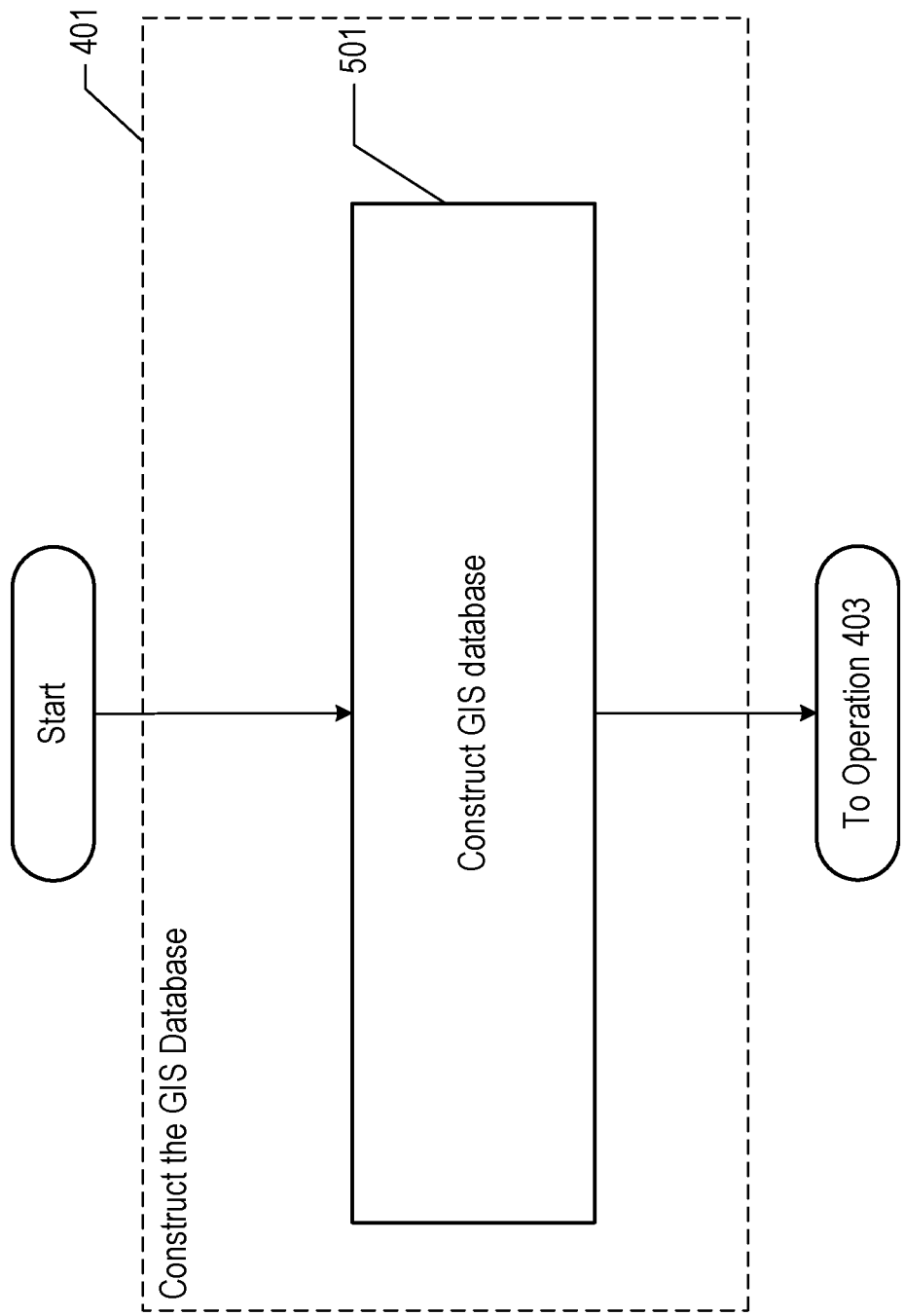
FIG. 5 depicts a flowchart of the salient processes performed in accordance with operation 401 of method 400.

Operation 401: Construct the GIS Database—FIG. 5 depicts a flowchart of the salient processes performed in accordance with operation 401.

At operation 501, the GIS database is constructed and stored in memory 303 of location engine 113. As part of operation 501, geographic region 120 is delimited and surveyed. The GIS database represents the geographic region within which wireless terminal might be present and whose location can be estimated.

In accordance with the illustrative embodiment, geographic region 120 comprises approximately four city blocks of an urban environment. It will be clear to those skilled in the art however, after reading this disclosure, how to make and use alternative embodiments of the present invention in which geographic region 120 has any area of any shape and any population density and development.

Figure 6:
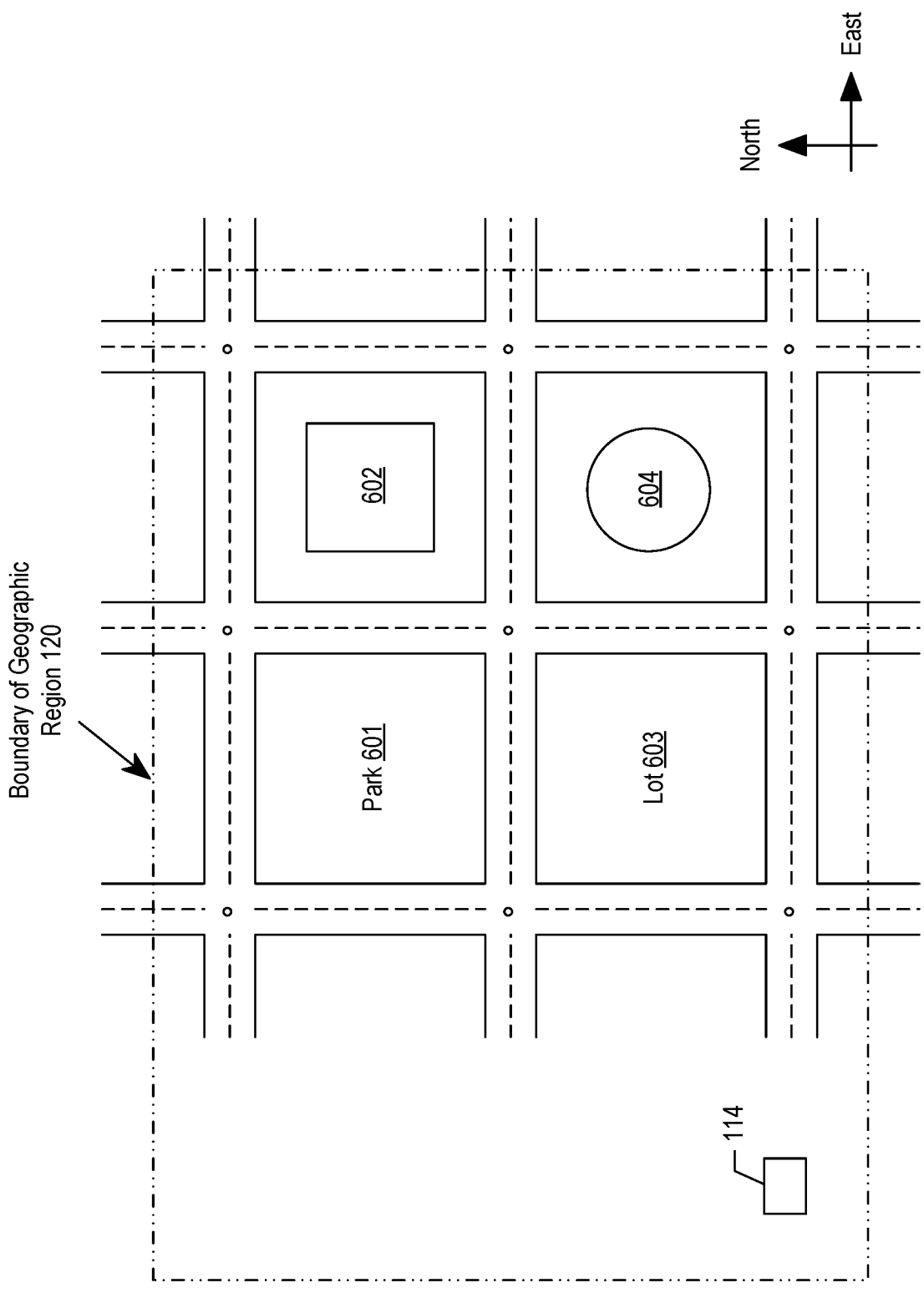
FIG. 6 depicts a map of the ground level of geographic region 120.

As part of operation 501, a detailed map of the ground level of geographic region 120 is made in well-known fashion, and as shown in FIG. 6. The elements within region 120 as depicted as not necessarily drawn to scale geographically. For example, airport pressure station 114 is depicted as being relatively close to the cluster of buildings in order to both fit all of the described elements within the same figure and provide sufficient detail for each element.

Figure 7:
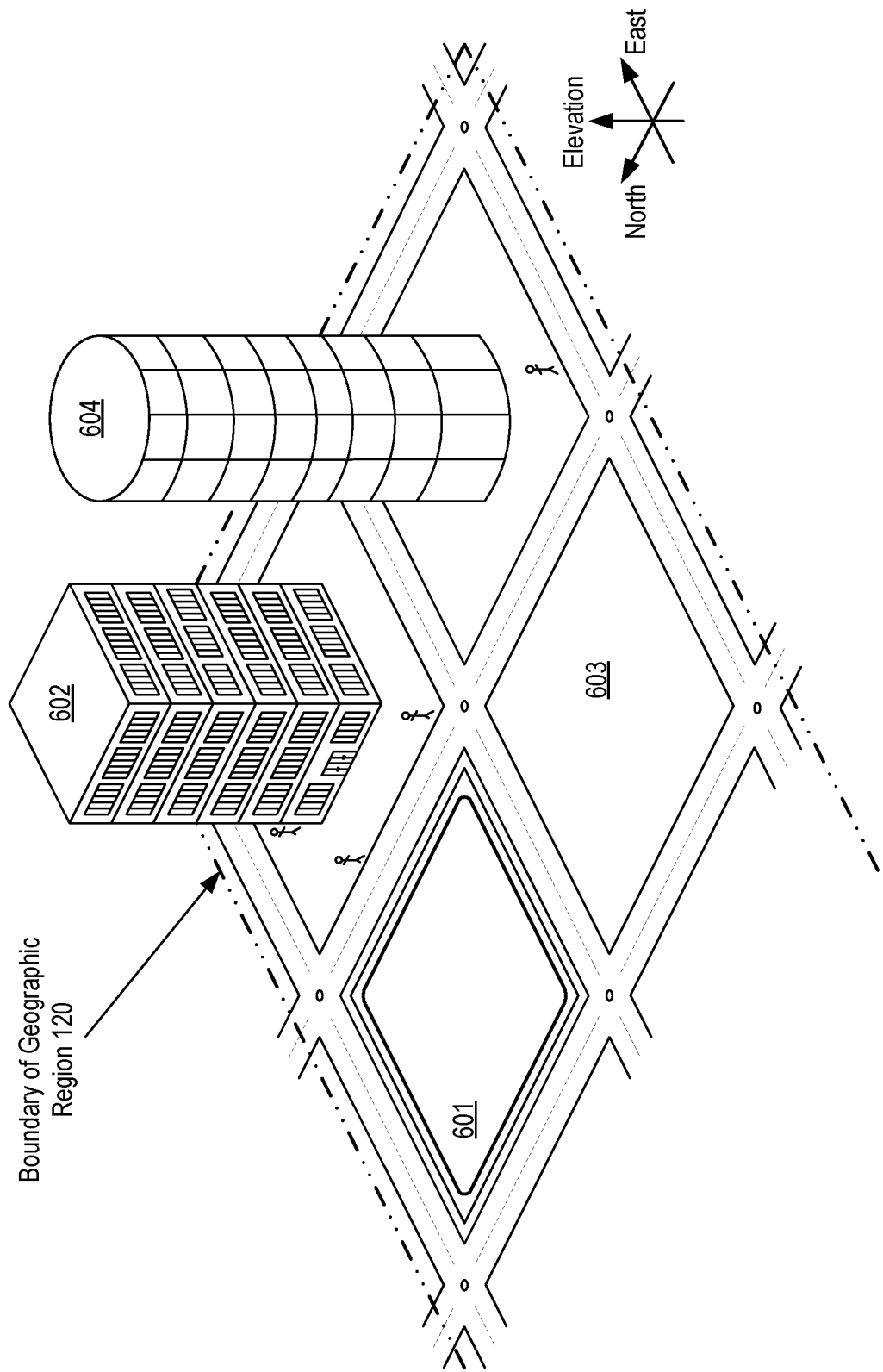
FIG. 7 depicts an isometric drawing of geographic region 120, including buildings.

FIG. 7 depicts an isometric drawing of a portion of geographic region 120, which spans approximately four city blocks and comprises, among other elements, park 601, boxy building 602, empty lot 603, cylindrical building 604, and airport pressure station 114. It will be clear to those skilled in the art, after reading this disclosure, how to make and use alternative embodiments of the present invention that comprise any area, any geographic features, and any number, size, height, and shape of structures, such as buildings 602 and 604.

Figure 8:
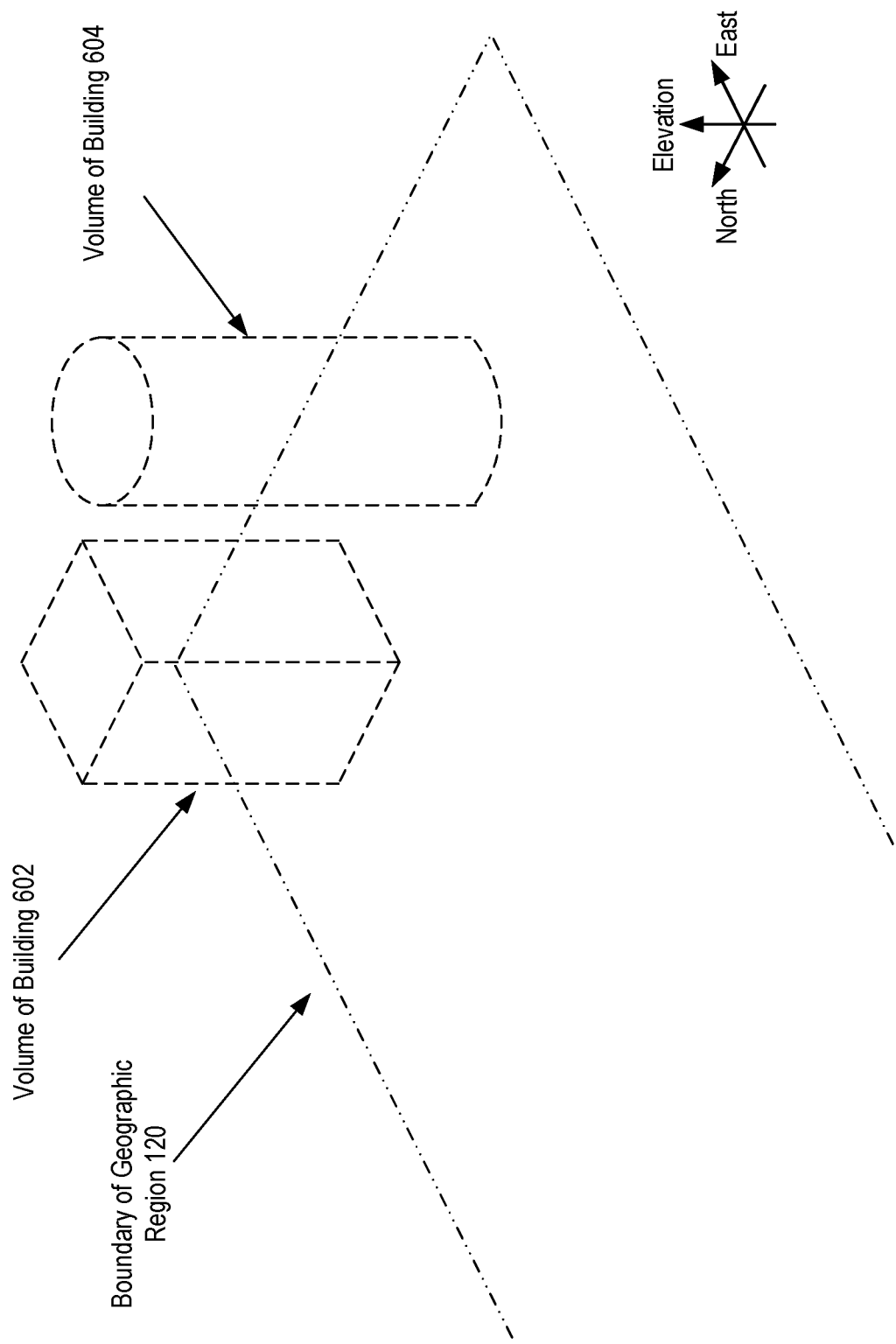
FIG. 8 depicts a three-dimensional survey of geographic region 120.

In accordance with the illustrative embodiment, as part of operation 501, the coordinate positions of the various features of one or more objects (e.g., buildings, structures, etc.) in geographic region 120 are determined and stored in the GIS database. The positions of one or more features of the objects can be determined by referencing the three-dimensional survey of geographic region 120, which is depicted in FIG. 8.

As described above, buildings 602 and 604 are represented with coordinates. As those who are skilled in the art will appreciate after reading this specification, in some embodiments of the present invention buildings 602 and 604, and objects in general, can be represented in a different way, such as by using a vector-based approach. For example and without limitation, one or more of the buildings in a geographic area can be described by a polygon shape of a building footprint, or rooftop, and the height of the building. Furthermore, any comparisons of distance can be made based on the polygon shape and/or polygon height stored, versus the coordinates stored.

Figure 9:
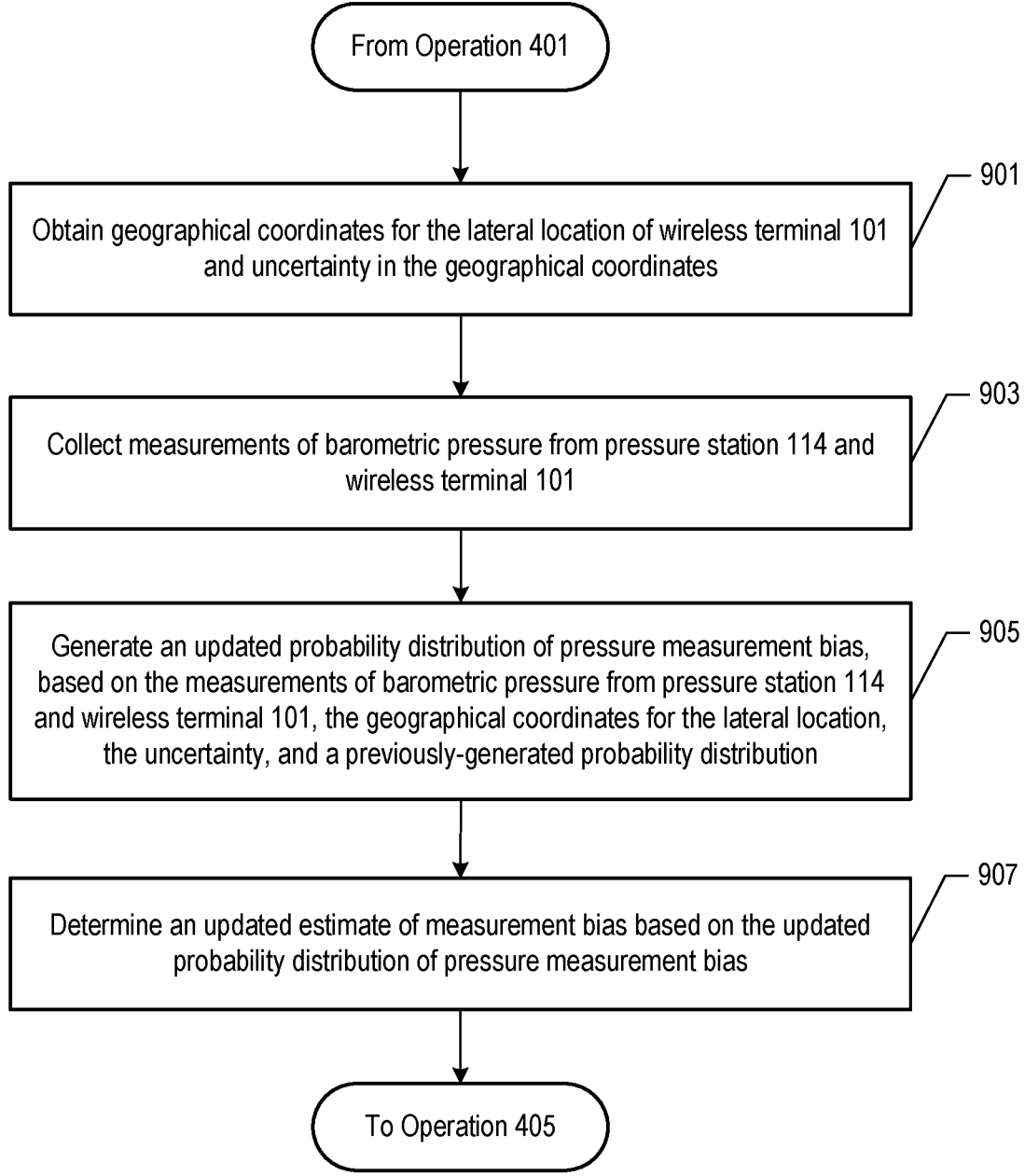
FIG. 9 depicts a flowchart of the salient processes performed in accordance with operation 403 of method 400.

Operation 403: Calibrate the Barometric Sensor of Wireless Terminal 101—FIG. 9 depicts a flowchart of the salient processes performed in accordance with operation 403.

In accordance with operation 901, location engine 113 obtains an estimate of the lateral location of wireless terminal 101. Operation 901 is similar to operation 405 described above and in regard to FIG. 4. The estimate of location comprises i) geographical coordinates of the location and ii) an uncertainty or uncertainties in the geographical coordinates of the estimate of location.

In accordance with the illustrative embodiment of the present invention, the first estimate of the location of wireless terminal 101 comprises a set of geographical coordinates representing the latitude/longitude ("lat/lon") of the wireless terminal. Latitude represents location along a first dimension (i.e., "north-south"), and longitude represents location along a second dimension (i.e., "east-west").

In some embodiments of the present invention, the first estimate of the location of wireless terminal 101 also comprises values for the uncertainties in one or more components of the location estimate (e.g., an uncertainty in latitude, an uncertainty in longitude, an overall uncertainty, etc.). The horizontal uncertainty is based on the underlying lateral location estimation technique that results in lat/lon coordinates. In general, the uncertainty can be expressed in terms of a confidence level, a distance given a particular confidence level, or a different well-known metric.

In accordance with operation 903, location engine 113 collects measurements of barometric pressure from airport pressure station 114 (i.e., either directly or indirectly) and wireless terminal 101. Operation 903 is similar to operation 407 described below and in regard to FIG. 17.

In accordance with operation 905, location engine 113 generates an updated probability distribution of the bias of pressure sensor 205 in wireless terminal 101. The updated probability distribution is defined by i) an updated lower bound of pressure bias, ii) a corresponding lower-bound uncertainty, iii) an updated upper bound of pressure bias, and iv) a corresponding upper-bound uncertainty. The updated probability distribution is based on i) the measurements of barometric pressure from pressure station 114 and wireless terminal 101 collected in accordance with operation 903, and ii) the geographical coordinates for the lateral location and the uncertainty obtained in accordance with operation 901, as well as iii) a previously-updated probability distribution, if available. Operation 905 is described below and in regard to FIG. 10.

In accordance with operation 907, location engine 113 determines an updated estimate of measurement bias based on the updated probability distribution of pressure bias determined in accordance with operation 905. Operation 907 is described below and in regard to FIG. 16.

After operation 907, control of task execution proceeds to operation 405.

Figure 10:
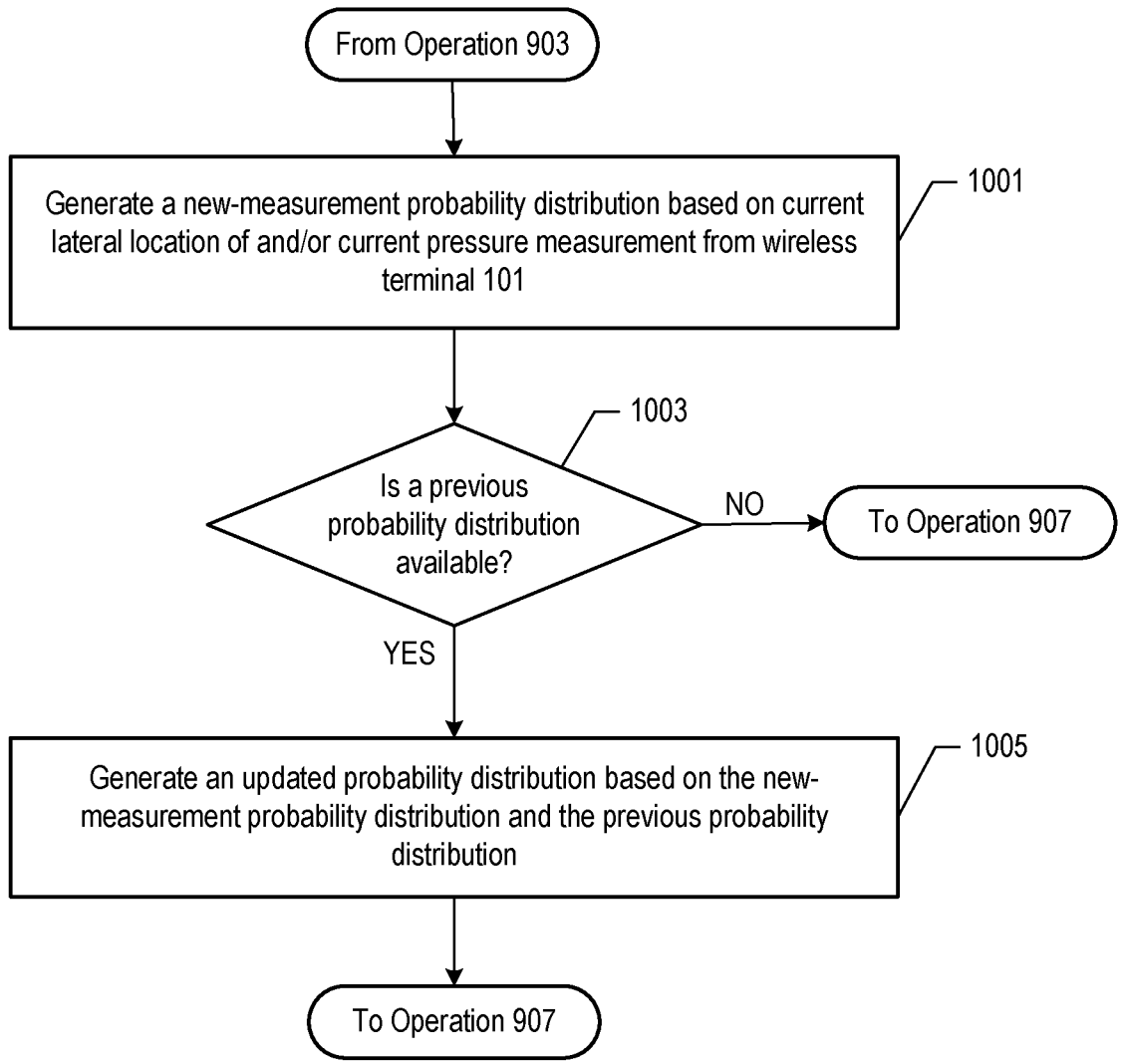
FIG. 10 depicts a flowchart of the salient processes performed in accordance with operation 905 of method 403.

Operation 905: Generate a Probability Distribution of Pressure Bias—FIG. 10 depicts a flowchart of the salient processes performed in accordance with operation 905.

Figure 15A:
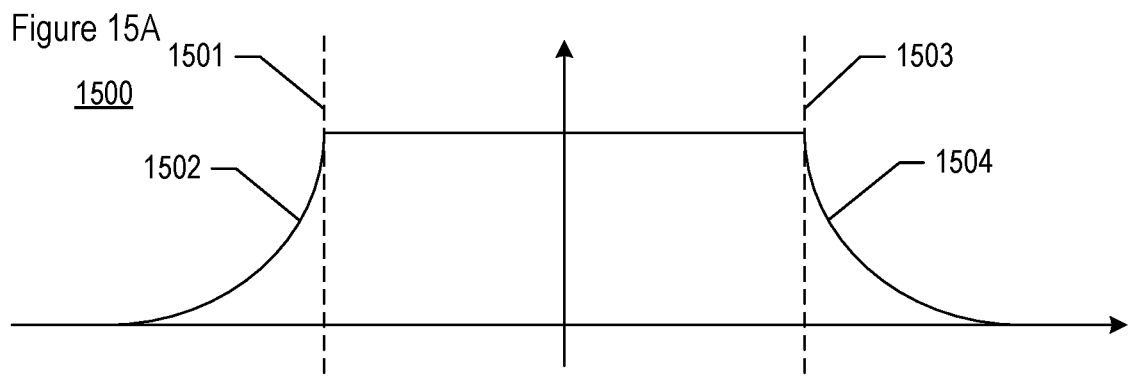
FIGS. 15A, 15B, 15C, and 15D depict various low/high probability distributions.

In accordance with operation 1001, location engine 113 generates a new-measurement probability distribution based on one or more new location measurements and/or pressure measurements. In some embodiments of the present invention, the distribution is characterized as having a flat top, with exponentially decaying sides. The distribution can be defined by four parameters: a low endpoint and a high endpoint, which define the interval of the flat top, as well as a lower uncertainty and an upper uncertainty, which define the average decay length of each of the exponential sides adjacent to the respective low endpoint and high endpoint. For pedagogical purposes, such a distribution is referred to in this specification as a "low/high distribution." FIG. 15A shows an example of new-measurement probability distribution 1500, described in detail below. Operation 1001 itself is described below and in regard to FIG. 11.

In accordance with operation 1003, location engine 113 determines whether or not a previous probability distribution is available—that is, a probability distribution generated prior to new-measurement probability distribution 1500. If a previous distribution is available—that is, from a prior iteration of operation 905—then control of execution proceeds to operation 1005. Otherwise, new-measurement distribution 1500 is used as the updated distribution in operation 907 and control passes to operation 907.

In accordance with operation 1005, location engine 113 generates an updated probability distribution by combining mathematically i) new-measurement probability distribution 1500 and ii) the previously-generated probability distribution.

A general approach of combining the two probability distributions is now described. Already stored in memory from a previous iteration of operation 905 is a previously-generated low/high distribution that describes the current knowledge about the pressure sensor bias. In accordance with operation 1001, location engine 113 generates a result that also provides bias information, and is also encoded as a low/high distribution. To update the probability distribution in accordance with operation 1003, location engine 113 multiplies the two low/high probability distributions and renormalizes the product into a resulting probability distribution. The resulting probability distribution is not a true low/high distribution, as defined earlier, so location engine 113 approximates a low/high distribution that best fits the resulting probability distribution.

In order to understand how location engine 113 approximates a low/high distribution, it is important to understand the limiting case in which there are only perfect uniform distributions being generated, wherein a perfect uniform distribution between the low and high endpoint has low and high uncertainties of zero. If location engine 113 were to multiply and renormalize two uniform distributions, the resulting distribution would be another uniform distribution whose interval is the intersection of the two. In that case, as location engine 113 receives more measurements, the intersection becomes smaller and smaller, thus resembling convergence.

The problem, however, is when the intervals do not overlap, in which case the resulting probability distribution is undefined. The underlying cause is that the real distribution does not suddenly drop off to zero. This is a main reason why location engine 113 uses a low/high distribution (i.e., with low/high uncertainties), in contrast to a uniform distribution (i.e., without low/high uncertainties), in accordance with the illustrative embodiment.

There are advantages to using the low/high distribution of the illustrative embodiment. First, as with the uniform distribution, due to its flat top, the low/high probability distribution is robust to the lack of independence between measurements. In particular, processing that involves a distribution with a flat top will not suddenly decrease the uncertainty from a large number of high-uncertainty measurements, as processing involving a Gaussian-like distribution would (i.e., with a peaked top). Second, unlike the uniform distribution, the low/high distribution elegantly and reasonably handles the case when the low/high interval of the new-measurement probability distribution and the low/high interval of the previously-generated probability distribution do not have a common intersection.

Figure 14:
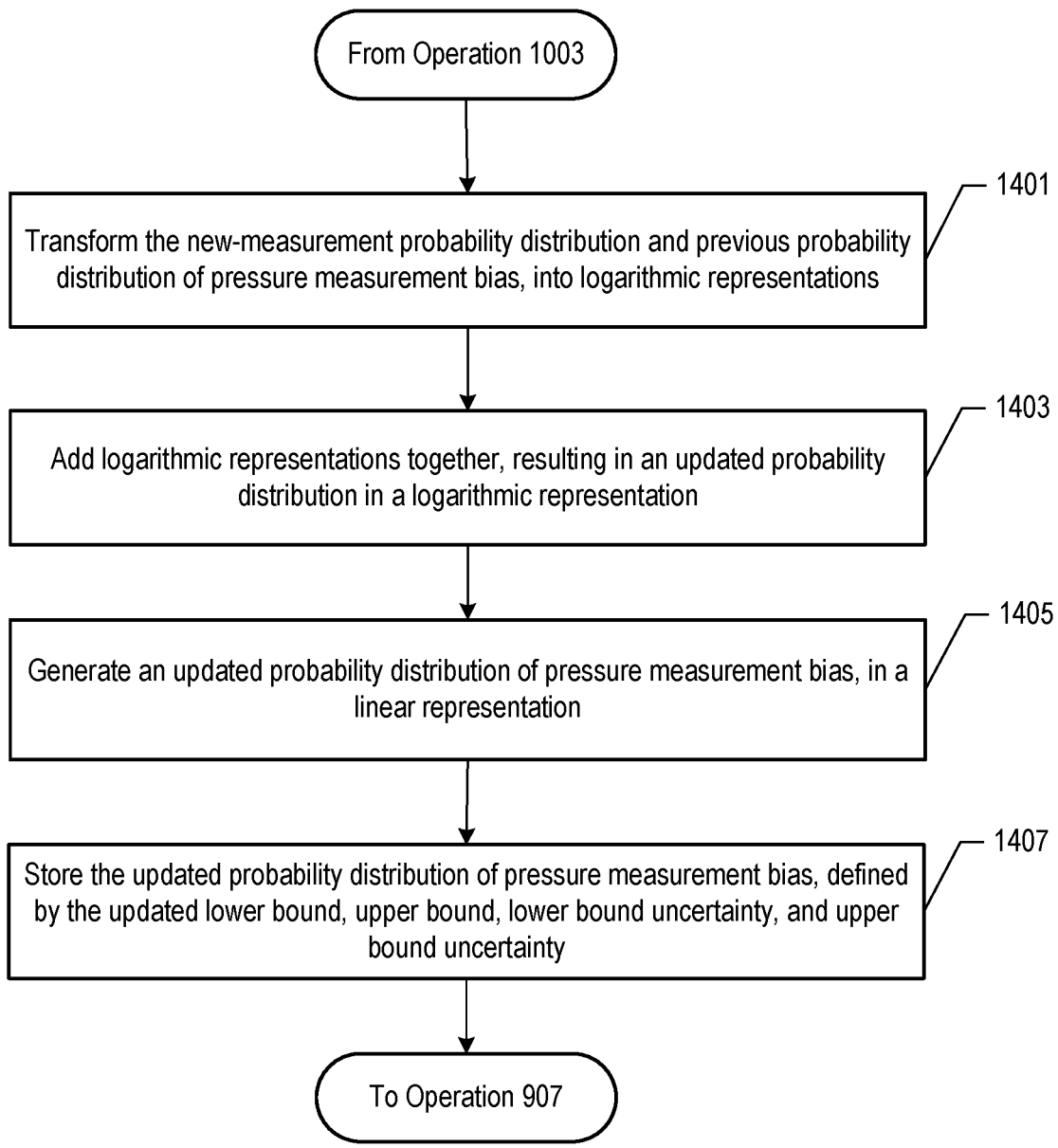
FIG. 14 depicts a flowchart of the salient processes performed in accordance with operation 1005 of method 905.

Operation 1005 is described in detail below and in regard to FIG. 14.

Figure 11:
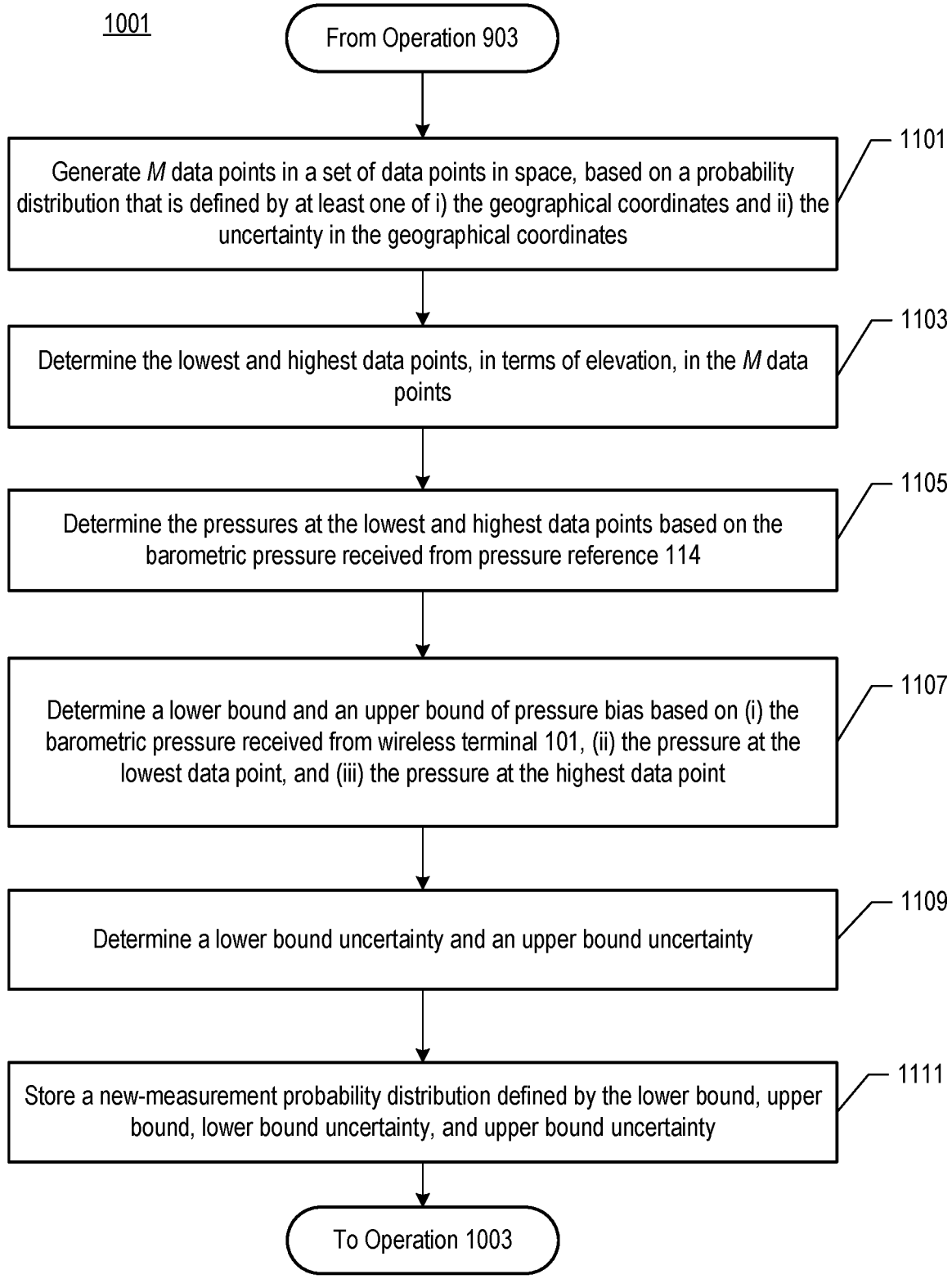
FIG. 11 depicts a flowchart of the salient processes performed in accordance with operation 1001 of method 905.

Operation 1001: Generate a New-Measurement Probability Distribution of Pressure Bias—FIG. 11 depicts a flowchart of the salient processes performed in accordance with operation 1001, in which location engine 113 generates new-measurement probability distribution 1500 based on one or more new measurements having been received by the location engine. For example, location engine 113 can receive geographical coordinates that describe the lateral location of wireless terminal 101 and/or an uncertainty in the lateral location of the wireless terminal, any of which can trigger operation 1001 or can be used in generating the new-measurement probability distribution. As those who are skilled in the art will appreciate, after reading this specification, location engine 113 can generate new-measurement probability distribution 1500, as well as apply distribution 1500 later on in order to update the current probability distribution at operation 1005, based on Bayesian inference or a different suitable method.

In accordance with operation 1101, location engine 113 generates data points from the geographical coordinates and/or the location uncertainty obtained in accordance with operation 901. The data points are members of a nonempty set of data points in space and, in some embodiments, are confined initially to a horizontal plane. The location engine generates the data points based on one or more probability distributions defined by at least one of i) the one or more geographical coordinates and ii) the uncertainty or uncertainties in the one or more geographical coordinates that are part of the estimate of location generated in accordance with operation 901. Location engine 113 generates the data points based on i) a first probability distribution that is defined by a first geographic coordinate value along a first dimension (e.g., x-axis, etc.), and/or ii) a second normal distribution that is defined by a second geographic coordinate value along a second dimension (e.g., y-axis, etc.), wherein the geographic coordinates are part of the estimate of location. The data points generated are represented by coordinate values along the represented dimensions.

In accordance with the illustrative embodiment, location engine 113 applies a normal (or Gaussian) distribution, or an approximation thereof, as the probability distribution along one or more dimensions of the nonempty set of data points. In some embodiments of the present invention, the nonempty set of data points in space is a "point cloud" or "pixel cloud," as is known in the art.

In some embodiments of the present invention, the center of the set of data points coincides with, or at least is based on, one or more of the latitude and the longitude provided in the estimate of location of wireless terminal 101 obtained at operation 901, in any combination. In some embodiments, the first geographic coordinate value defines the mean of the first probability distribution and/or the second geographic coordinate value defines the mean of the second probability distribution.

In some embodiments of the present invention, a horizontal component of the uncertainty (i.e., in the one or more geographical coordinates of the first estimate), $H_{unc}$, defines the standard deviation of a probability distribution along a horizontal dimension.

Location engine 113 generates M data points, in the form of lateral coordinate values, for the set of data points in space. The $m^{th}$ data point $(P_{mx}, P_{my})$ in the set of data points, for m equals 1 through M, is based on the following equations:

$$P_{mx} = N_m(X, H_{unc}) \quad \text{(Eq. 2)}$$

$$P_{my} = N_m(Y, H_{unc}) \quad \text{(Eq. 3)}$$

wherein:
(X, Y) represents the geographical coordinates of latitude and longitude, respectively, of the estimate of location of wireless terminal 101,
$H_{unc}$ represents the horizontal (lateral) uncertainty across latitude and longitude,
$N_m(\mu, \sigma)$ is a random variable of normal distribution with mean $\mu$ and standard deviation $\sigma$, generated for data point m.

Put differently, for all M data points $(P_{mx}, P_{my})$, the set of $P_{mx}$ values is characterized by a first probability distribution, and the set of $P_{my}$ values is characterized by a second probability distribution, which might or might not be the same as the first probability distribution.

Location engine 113 generates M data points total, as described above, wherein the value of M can be selected to achieve an accuracy to a desired number of significant digits. For example, the value of M can be equal to 100. In some embodiments of the present invention, the number of data points M can be based on the estimation uncertainty or on the environment, or both. For example, a greater uncertainty might dictate generating more data points, while a lesser uncertainty might dictate generating fewer data points.

In accordance with operation 1103, location engine 113 determines, in terms of elevation of the corresponding geographical coordinates, the lowest data point and the highest data point in the set of M data points generated in accordance with operation 1101. In some embodiments of the present invention, these points correspond to the lowest and highest elevations at which wireless terminal 101 can be present (e.g., at the top of a building, at the bottom of a building, on or near ground level but not in high up and in mid-air, etc.). The elevation that corresponds to the coordinates of each data point can be obtained from the GIS database constructed in accordance with operation 501. In the GIS database, the terrain data includes elevation data obtained previously (e.g., by sampling the terrain surface, etc.) and the building data includes building height data (i.e., the highest points of the building) and depth data (i.e., the lowest points of the building) obtained previously (e.g., by relying on building construction specifications, etc.).

Figure 12A:
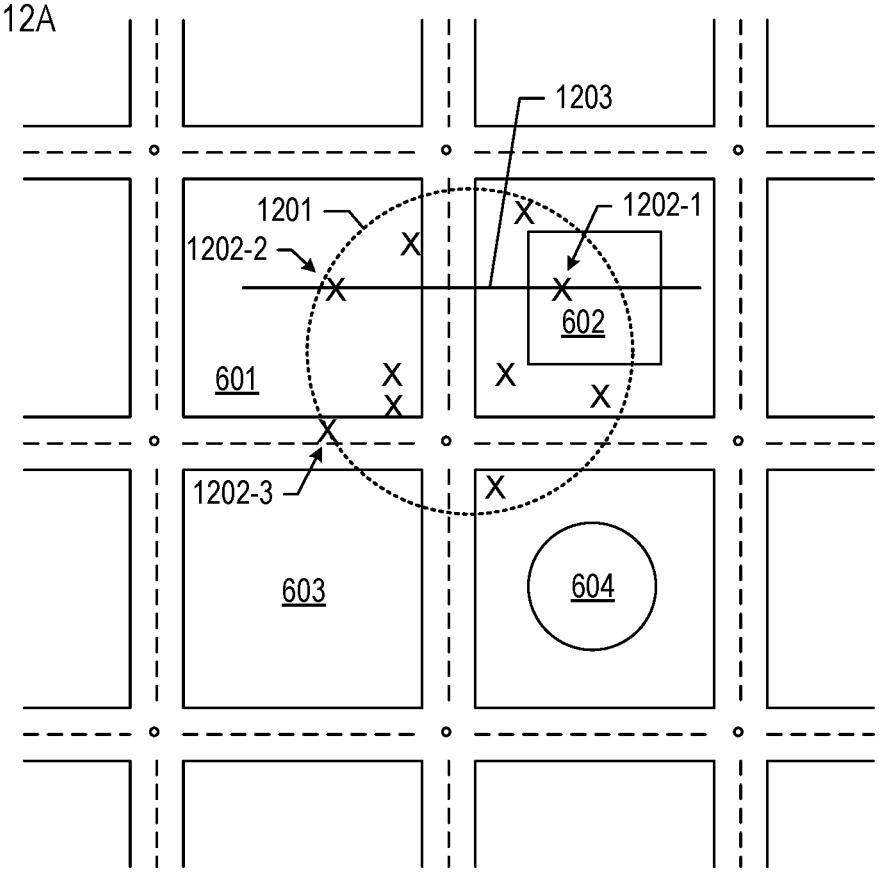
FIGS. 12A and 12B depicts a first example of the data points generated in accordance with operations 1101 and 1103.
Figure 12B:
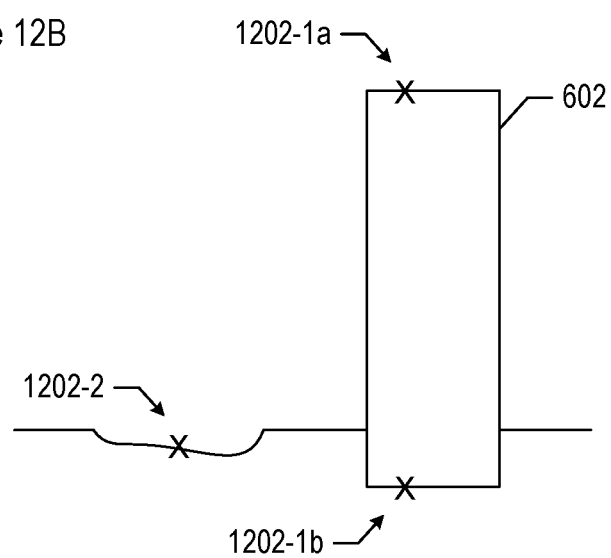

FIGS. 12A and 12B depicts a first example of the data points generated in accordance with operations 1101 and 1103, and corresponding to the estimated location of wireless terminal 101 at time $t_1$ determined in accordance with operation 901. FIG. 12A depicts a top view of a portion of geographic region 120, including buildings 602 and 604 and the area in the vicinity of the buildings. FIG. 12B depicts an elevation view of a slice, along line 1203, of what is depicted in FIG. 12A.

FIGS. 12A and 12B also depict at least some of the data points that make up point cloud 1201, which comprises the data points generated in accordance with operation 1101. Some of the data points in point cloud 1201 are data points 1201-1, 1201-2, and 1201-3. The position of each of the data points within point cloud 1201 is marked with an "X". For reasons of clarity, point cloud 1201 is depicted as a circle having a radius defined by the position of the data point furthest away from center of the circle, namely data point 1201-3, although the data points themselves exist in memory as discrete points and correspond to geographical coordinates. The larger the circle, the greater the uncertainty in the estimate of location; the smaller the circle, the lesser the uncertainty in the estimate of location. The coordinates of the discrete data points coexist with the coordinates of the various features stored in the GIS database, such as features associated with buildings 602 and 604 and terrain-related features.

Point cloud 1201 is centered around the estimate of the location of wireless terminal 101 at time $t_1$, obtained in accordance with operation 901. As depicted, the estimate of location at time $t_1$ has wireless terminal 101 in the vicinity of building 602. In regard to the highest data point within point cloud 1201, location engine 113 determines that data point 1202-1, coinciding with building 602, is at a lateral location having the highest elevation—that is, at the top of the building. In regard to the lowest data point, although data point 1202-2 is at a lateral location having the lowest terrain elevation, data point 1202-1 is at a lateral location having the lowest elevation overall—that is, in the basement of the building and lower than at any point in the nearby terrain, including at data point 1202-2.

As mentioned earlier, FIG. 12B is an elevation view along line 1203, which is defined by data points 1202-1 and 1202-2. FIG. 12B includes data point 1202-1—now split into highest point 1202-1a and lowest point 1202-1b—and data point 1202-2. Although data point 1202-2 is the lowest point in the terrain, it is not as low as data point 1202-1b, the lowest point overall.

Figure 13A:
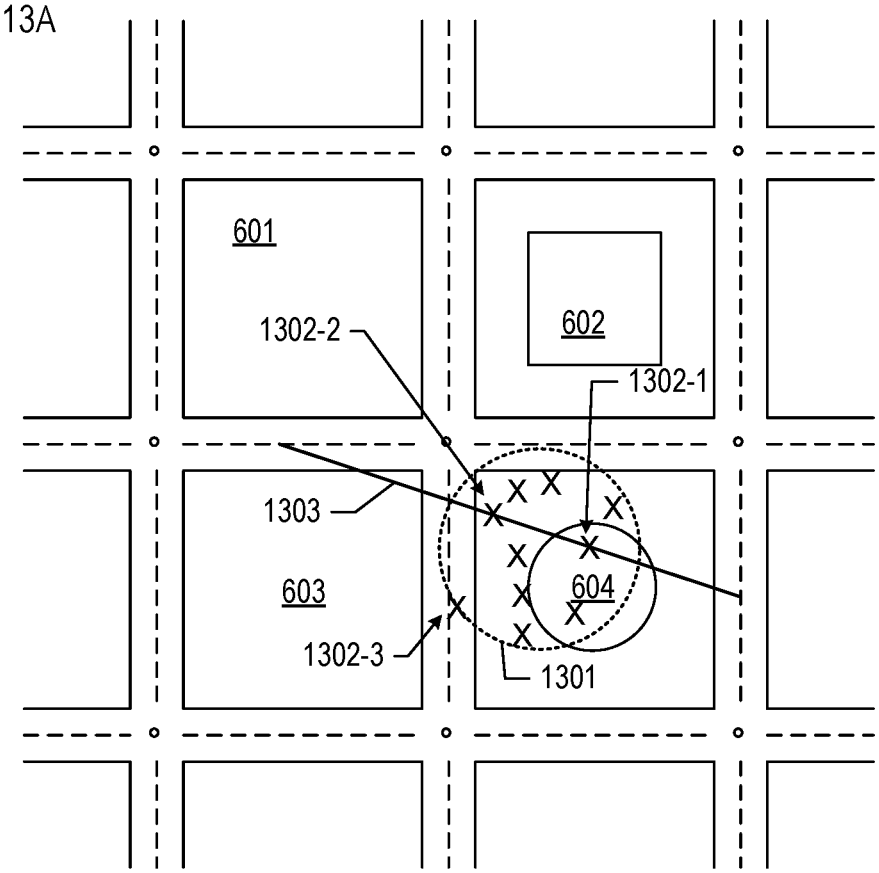
FIGS. 13A and 13B depict a second example of the data points generated in accordance with operations 1101 and 1103.
Figure 13B:
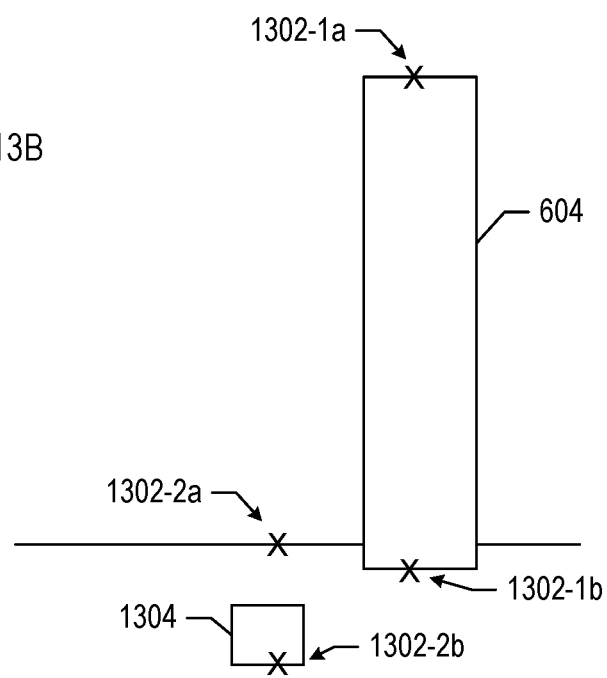

FIGS. 13A and 13B depict a second example of the data points generated in accordance with operations 1101 and 1103, and corresponding to the estimated location of wireless terminal 101 at time $t_2$ determined in accordance with operation 901. FIG. 13A depicts a top view of a portion of geographic region 120, including buildings 602 and 604 and the area in the vicinity of the buildings. FIG. 13B depicts an elevation view of a slice, along line 1303 defined by points 1301-1 and 1301-2, of what is depicted in FIG. 13A.

FIGS. 13A and 13B also depict at least some of the data points that make up point cloud 1301, which comprises the data points generated in accordance with operation 1101. Some of the data points in point cloud 1301 are data points 1301-1, 1301-2, and 1301-3. The position of each of the data points within point cloud 1301 is marked with an "X". Point cloud 1301 is depicted as a circle having a radius defined by the position of the data point furthest away from center of the circle, namely data point 1301-3.

Point cloud 1301 is centered around the estimate of the location of wireless terminal 101 at time $t_2$, obtained in accordance with operation 901. As depicted, the estimate of location at time $t_2$ has wireless terminal 101 in the vicinity of building 604. Each of points 1301-1 and 1301-2 are candidates for both the lowest point and highest point within point cloud 1301 and, as such, are split into points 1301-1a and 1301-1b and points 1302-1a and 1302-1b, respectively. In regard to the highest data point within point cloud 1301, location engine 113 determines that data point 1302-1a, coinciding with building 604, is at a lateral location having the highest elevation—that is, at the top of the building. In regard to the lowest data point, although data point 1302-1b coincides with the basement of building 604, data point 1302-2b is at a lateral location having the lowest elevation overall—that is, at the bottom of subway tunnel 1304.

In accordance with operation 1105, location engine 113 determines the atmospheric pressures for the lowest data point and the highest data point determined in accordance with operation 1103. Location engine 113 uses a barometric pressure measurement at airport pressure station 114 and, knowing the elevation of pressure station 114 with respect to a particular reference level (e.g. mean sea level, etc.), scales the pressure measurement up or down to the lowest data point and to the highest data point. This results respectively in a highest possible pressure and a lowest possible pressure, recognizing that atmospheric pressure is inversely related to elevation. Bias-adjusted pressure of wireless terminal 101 can be expected to fall within the range of the highest and lowest possible pressures.

In accordance with operation 1107, location engine 113 determines a lower bound and an upper bound of pressure bias for the current set of data. Engine 113 determines the lower bound of pressure bias based on i) the barometric pressure received from wireless terminal 101 in accordance with operation 903, minus ii) the highest possible pressure (i.e., at the lowest-elevation data point) determined in accordance with operation 1105. Engine 113 determines the upper bound of pressure bias based on i) the barometric pressure received from wireless terminal 101 in accordance with operation 903, minus ii) the lowest possible pressure (i.e., at the highest-elevation data point) determined in accordance with operation 1105.

In accordance with operation 1109, location engine 113 determines a lower uncertainty associated with the lower bound determined in accordance with operation 1107 and an upper uncertainty associated with the upper bound determined in accordance with operation 1107. The lower and upper uncertainties describe the average decay length of each of the exponential sides of the low/high distribution, in some embodiments of the present invention.

There are various reasons why these uncertainties exist, and the calculation of the lower and upper uncertainties is based on an understanding of the reasons. A first reason is that the GIS data (e.g., terrain, building features, etc.) that is being used to determine upper and lower bounds of pressure bias might be inaccurate or in error. For example, the building data (e.g., building height, basement depth, etc.) might only be guaranteed to a certain accuracy. A second reason is that a weather station reference is used to convert elevation to pressure biases, and the weather station reference itself can introduce uncertainties. A third reason is that the lat-lon uncertainties there are used to generate the data points in operation 1101 can introduce uncertainty in the lower bound and upper bound of the pressure bias.

In accordance with operation 1111, location engine 113 stores a new-measurement probability distribution defined by the lower bound, upper bound, lower bound uncertainty, and upper bound uncertainty.

Control of task execution then passes to operation 1003.

Operation 1005: Generate an Updated Probability Distribution of Pressure Measurement Bias—FIG. 14 depicts a flowchart of the salient processes performed in accordance with operation 1005 for generating an updated probability distribution of pressure measurement bias.

Figure 15B:
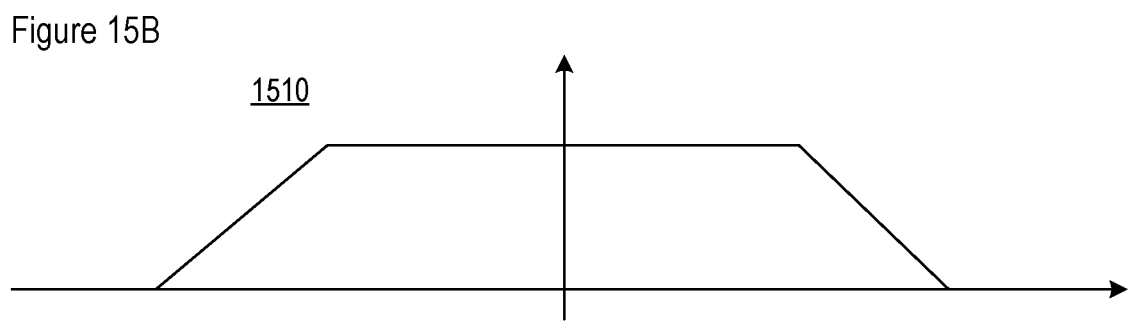
Figure 15C:
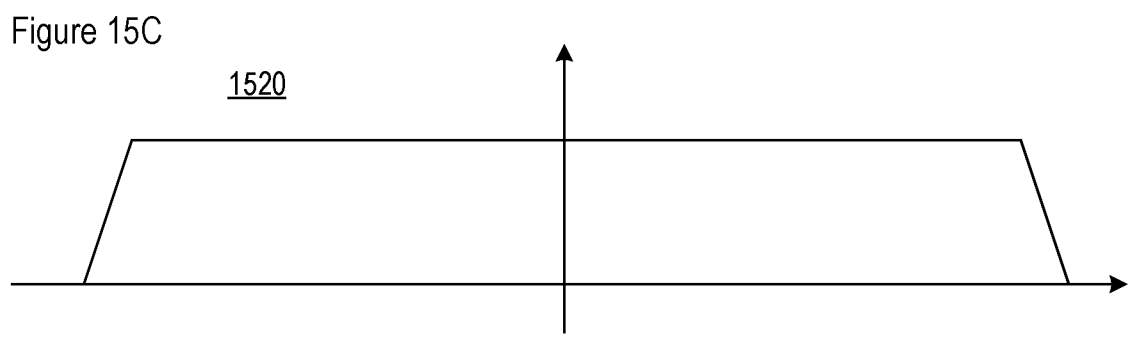
Figure 15D:
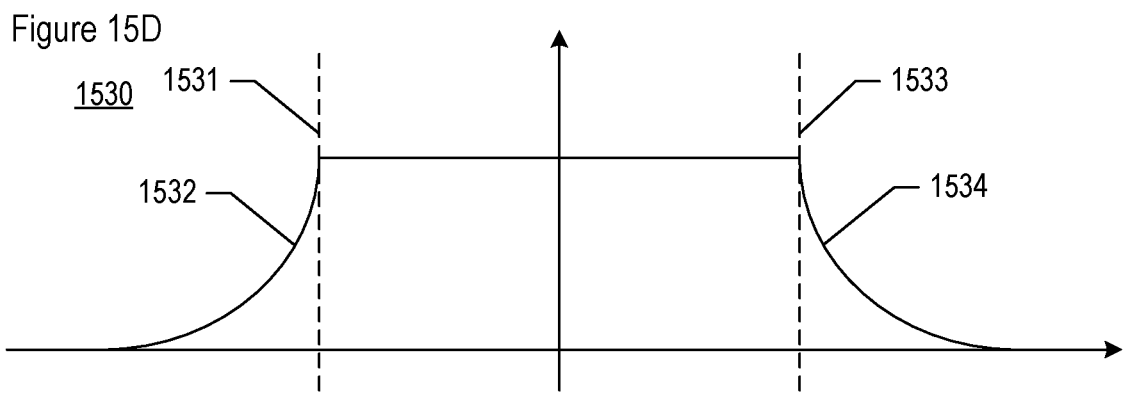

FIGS. 15A, 15B, 15C, and 15D various low/high probability distributions used in operation 1005 and elsewhere. FIG. 15A depicts new-measurement distribution 1500, defined by lower bound 1501, upper bound 1503, lower bound uncertainty 1502, and upper bound uncertainty 1504, and obtained in accordance with operation 1001. FIG. 15B depicts logarithmic distribution 1510, which is the logarithmic representation of linear distribution 1500, transformed as described below and in regard to operation 1401. FIG. 15C depicts logarithmic distribution 1520, which is the logarithmic representation of a previous version of distribution 1530 and that had been obtained in a previous iteration of operation 1005. FIG. 15D depicts updated distribution 1530, a linear distribution, which is the result of adding distributions 1510 and 1520 and then approximating a linear distribution, as described below.

In accordance with operation 1401, location engine 113 transforms, into logarithmic representations, new-measurement distribution 1500, stored in accordance with operation 1111, and a version of probability distribution 1530 from a previous iteration of operation 1401, which was stored in accordance with a previous iteration of operation 1407 described below. The logarithmic transformation results in distributions 1510 and 1520, respectively.

The rationale for the transformation is now explained. As described above, location engine 113 multiplies two low/high distributions in order to produce an updated distribution. In order to multiply two low/high distributions, it can be simpler to work with the log of the distributions, since the addition of two log distributions is the equivalent of the multiplication of two linear representations. The logarithmic representation of a low/high distribution has a flat top as before, but with linearly sloping sides instead of exponentially decaying sides.

In accordance with operation 1403, location engine 113 adds the two log distributions together. The addition of two log distributions is a piecewise linear function that is also concave downward.

In accordance with operation 1405, location engine 113 generates an updated probability distribution. This requires approximating the result of operation 1403 back into a linear representation of a low/high distribution. This approximating is necessary because the result of operation 1403 is not a true low/high distribution, even though it appears to be.

In order to approximate the result of operation 1403 back into a low/high distribution, location engine 113 uses a variant of the k-means clustering algorithm described in Magnani, A. & Boyd, S. P. "Convex piecewise-linear fitting," Optimization and Engineering, March 2009, Volume 10, Issue 1, pp 1-17, incorporated by reference herein. The variant is summarized here. Location engine 113 samples the exact log distribution (e.g., with 200 samples) over the interval where the log distribution is no less the maximum (e.g., by two). Engine 113 then gives an initial assignment of which samples belong the three groups consisting of the flat top, the left (lower) slope, and the right (upper) slope. To refine the assignment, engine 113 takes the best fit lines for each of the three groups; for the flat top, engine 113 takes the average y-value. Then, the resulting low/high approximation is the pointwise minimum (the lower envelope) of these three best fit lines, with the new assignment for the samples being determined by the new low/high approximation. The process of approximating is iterated until the sample assignment does not change.

The result of operation 1405 is depicted in FIG. 15D, depicting distribution 1530, defined by lower bound 1531, upper bound 1533, lower bound uncertainty 1532, and upper bound uncertainty 1534.

In accordance with operation 1407, location engine 113 stores an updated probability distribution probability distribution 1530, defined by the lower bound, upper bound, lower bound uncertainty, and upper bound uncertainty.

Control of task execution then passes to operation 907.

Figure 16:
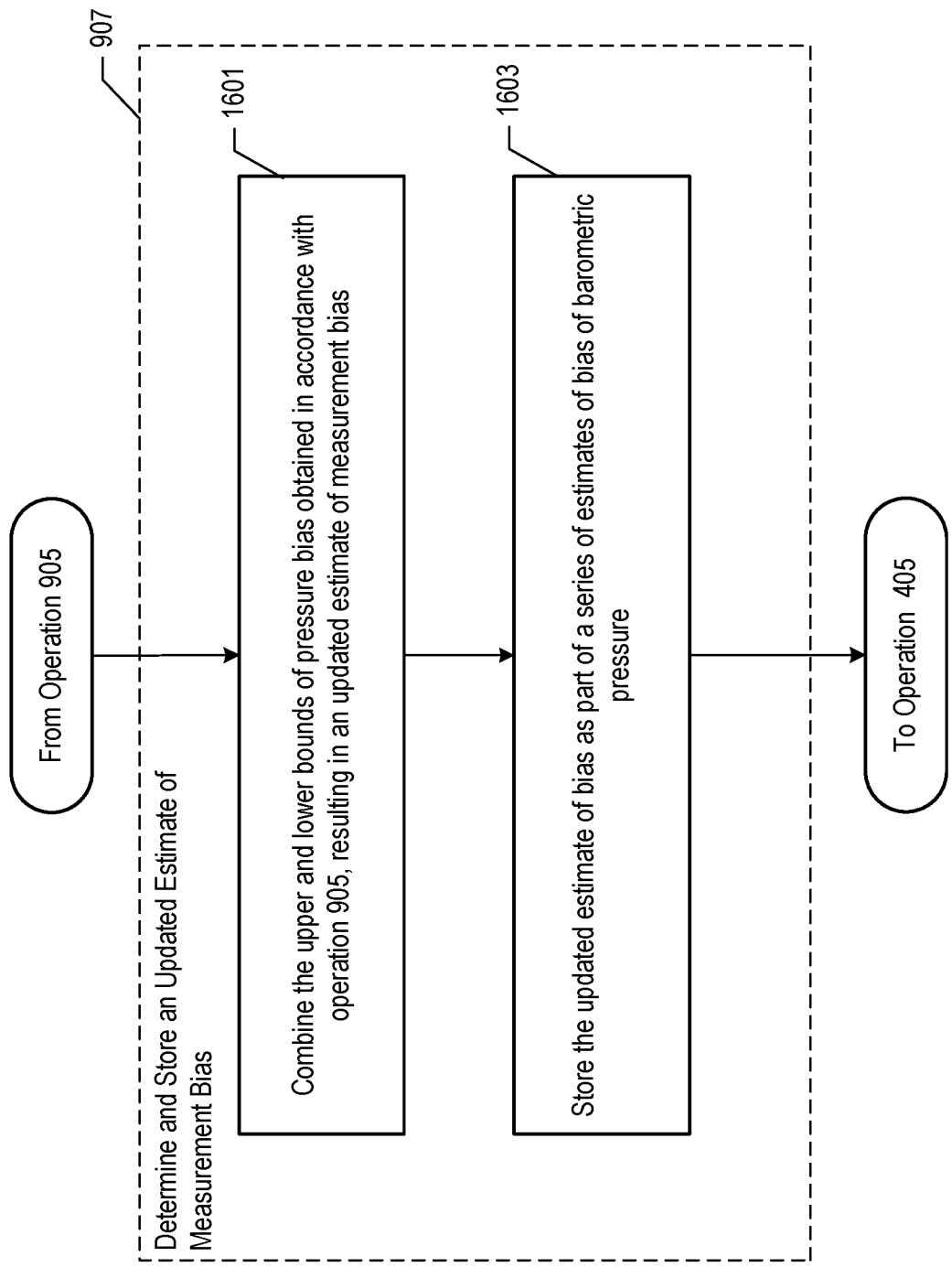
FIG. 16 depicts a flowchart of the salient processes performed in accordance with operation 907.

Operation 907: Determine and Store an Updated Estimate of Measurement Bias—FIG. 16 depicts a flowchart of the salient processes performed in accordance with operation 907.

In accordance with operation 1601, location engine 113 combines the upper and lower bounds of pressure bias obtained in accordance with operation 905, result in an updated estimate of the pressure measurement bias of wireless terminal 101. In accordance with the illustrative embodiment, location engine 113 bases the updated estimate on the midpoint (i.e., mean) of lower bound 1531 and upper bound 1533. In some alternative embodiments of the present invention, location engine 113 bases the updated estimate on the mean of the overall shape of updated distribution 1530, including lower tail 1532 defined by the lower uncertainty and upper tail 1534 defined by the upper uncertainty.

In accordance with operation 1603, location engine 113 stores the updated estimate of bias as part of a series of estimates of bias of barometric pressure at wireless terminal 101, wherein the series further comprises estimates of bias generated in previous or subsequent iterations of operation 403. Location engine 113 can analyze (e.g., perform trend analysis on, etc.) the series of estimates of bias in order to determine whether additional calibration is needed in accordance with operation 403.

In some embodiments of the present invention, location engine 113 performs calibration of wireless terminal 101's barometer repeatedly (e.g., periodically, sporadically, on-demand, etc.), in order to account for any drift of the barometric pressure measurements. Drift can be attributed to the aging of the barometric sensor and other possible characteristics (e.g., temperature, humidity, etc.), temporal-dependent or otherwise, and is often reflected in the trend of the estimates of bias stored at operation 1603. In some embodiments of the present invention, location engine 113 triggers re-calibration based on a predefined change in temperature and/or humidity measured by wireless terminal 101, over a period of time.

After operation 1603, control of task execution proceeds to operation 405.

Figure 17:
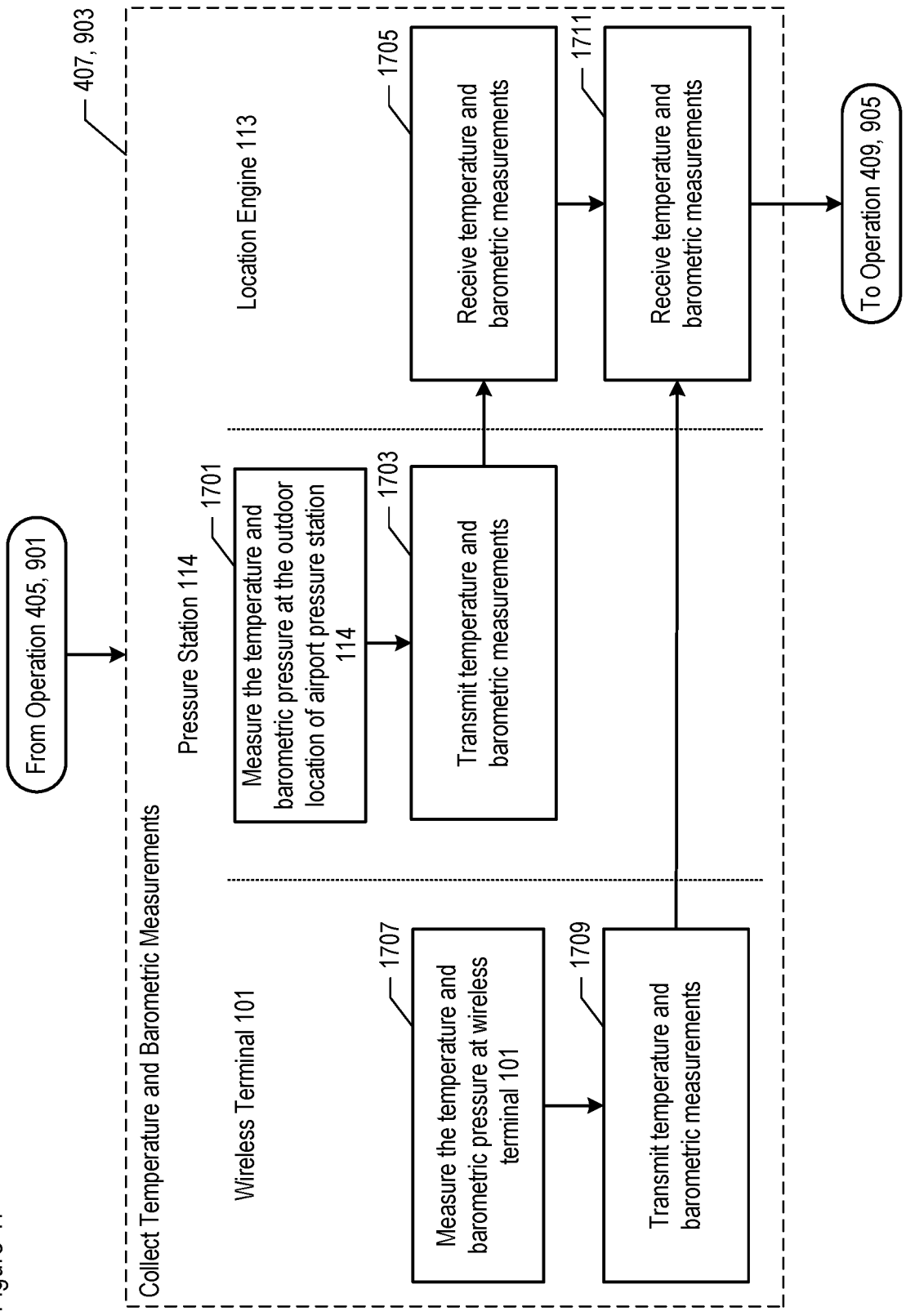
FIG. 17 depicts a flowchart of the salient processes performed in accordance with operation 407 and operation 903.

Operation 407: Collect Temperature and Barometric Measurements—FIG. 17 depicts a flowchart of the salient processes performed in accordance with operation 407 and operation 903.

In accordance with operation 1701, airport pressure station 114 measures samples of temperature, $T_W$, and barometric pressure, $P_W$, in its vicinity. In some embodiments of the present invention, each sample represents one measurement of temperature or of barometric pressure, while in some other embodiments each sample comprises more than one measurement of temperature or of barometric pressure.

In accordance with operation 1703, airport pressure station 114 transmits a measurement of temperature, $T_W$, (i.e., provides a measurement of temperature at the outdoor location of station 114) and atmospheric pressure, $P_W$, (i.e., provides a measurement of barometric pressure at the outdoor location of station 114) to location engine 113. In accordance with the illustrative embodiment, operation 1703 is performed every 10 minutes, but it will be clear to those skilled in the art how to make and use alternative embodiments of the present invention that transmit the measurements at other times.

In accordance with operation 1705, location engine 113 receives the measurement of temperature, $T_W$, and a measurement of atmospheric pressure, $P_W$, transmitted in accordance with operation 1703.

In accordance with operation 1707, wireless terminal 101 measures samples of temperature, $T_T$, and barometric pressure, $P_T$, in its vicinity by using barometer 205. In some embodiments of the present invention, each sample represents one measurement of temperature or of barometric pressure made by wireless terminal 101, while in some other embodiments each sample comprises more than one measurement of temperature or of barometric pressure made by the wireless terminal. In accordance with the illustrative embodiment, a measurement of temperature or of barometric pressure is taken once per second, but it will be clear to those skilled in the art how to make and use alternative embodiments of the present invention that take the measurements at a different rate (e.g., 5 per second, 10 per second, etc.).

In accordance with operation 1709, wireless terminal 101 transmits a measurement of temperature, $T_T$, and a measurement of atmospheric pressure, $P_T$, to location engine 113. In accordance with the illustrative embodiment, operation 1709 is performed every 5 seconds, but it will be clear to those skilled in the art how to make and use alternative embodiments of the present invention that transmit the measurements at other times.

In accordance with operation 1711, location engine 113 receives the temperature and atmospheric measurements transmitted in accordance with operation 1709. In some embodiments of the present invention, location engine 113 combines the values of multiple pressure samples (e.g., by calculating a median, etc.) in order to reduce measurement noise.

Operations 1701 through 1711 are performed continuously, concurrently, and asynchronously, in accordance with the illustrative embodiment.

Operation 409: Generate an Estimate of Elevation—FIG. 18 depicts a flowchart of the salient processes performed in accordance with operation 409.

In accordance with operation 1801, location engine 113 corrects the current pressure measurement $P_T$ by applying to it the latest estimate of bias that is determined in accordance with operation 1601, resulting in corrected pressure measurement $P_B$. It will be clear to those who are skilled in the art, after reading this specification, how to apply (e.g., add, subtract, etc.) a single estimate of bias based on how the estimation process has been implemented.

In some embodiments of the present invention, one or more biases from the series of biases stored and maintained in accordance with operation 1603, are applied to the current pressure measurement, for example, by an exponential average, a differently weighted average, a straight average, and so on. In some embodiments of the present invention, the one or more biases are applied based on seasonal conditions or diurnal conditions.

In accordance with operation 1803, location engine 113 generates an estimate of the elevation of wireless terminal 101 that is based on pressure data and outdoor scale height. The estimate, $Z_T$, is based on:

$$Z_T = -H_{OUT} \cdot \ln\left(\frac{P_B}{P_W}\right) + Z_W \quad \text{(Eq. 4)}$$

wherein:

$H_{OUT}$ is the outdoor scale height of the atmosphere, which is the elevation at which the atmospheric pressure has decreased to $e^{-1}$ times its value at mean sea level (e.g., approximately 8400 meters) and is based on outdoor temperature, $T_W$.

$P_B$ is the relevant measurement of barometric pressure received from wireless terminal 101 corrected for measurement bias in accordance with operation 1801, $P_W$ is the measurement of atmospheric pressure at airport pressure station 114 (in Pascals), and $Z_W$ is the elevation of airport pressure station 114.

In some embodiments of the present invention, measurements $P_T$ and $P_W$ are used that coincide in time with $T_T$ and $T_W$ as closely as possible. In accordance with the illustrative embodiment, location engine 113 has access to multiple airport pressure stations, such as airport pressure station 114, and uses a pressure measurement $P_W$ from the particular airport pressure station that is the closest in distance to the lateral location estimated in accordance with operation 405. In some embodiments of the present invention, location engine 113 uses measurements from the airport pressure station that is most relevant to the lateral location estimated in accordance with operation 405, in some way other than being closest in distance.

As those who are skilled in the art will appreciate after reading this specification, in some alternative embodiments $Z_T$ can be determined using a different equation than that described above. Additionally, in some embodiments of the present invention $Z_T$ can also be based on the lateral location of wireless terminal 101 estimated in accordance with operation 405. In some embodiments of the present invention, location engine 113 accounts for indoor and/or outdoor temperatures, stack effects in a building, and so on.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method of estimating the elevation of a wireless terminal, the method comprising:

receiving, by a data processing system, a first estimate of location of a wireless terminal;

receiving, by the data processing system, a first measurement of barometric pressure at the wireless terminal;

generating, by the data processing system, data points in a nonempty first set of data points in space based on the first estimate of location of the wireless terminal, wherein the data points correspond to geographical coordinates;

generating, by the data processing system, a first probability distribution of pressure measurement bias defined by:

(i) a first estimate of bias of barometric pressure measured by the wireless terminal, wherein the first estimate of bias is based on (a) a first data point whose geographical coordinates are at the lowest elevation in the first set of data points, and (b) the first measurement of barometric pressure at the wireless terminal, and (ii) a second estimate of bias of barometric pressure measured by the wireless terminal, wherein the second estimate of bias is based on (a) a second data point whose geographical coordinates are at the highest elevation in the first set of data points, and (b) the first measurement of barometric pressure at the wireless terminal;

receiving, by the data processing system, a second measurement of barometric pressure at the wireless terminal; and generating, by the data processing system, an estimate of the elevation of the wireless terminal based on (a) the second measurement of barometric pressure at the wireless terminal, and (b) the first probability distribution of pressure measurement bias.

2. The method of claim 1 further comprising transmitting the estimate of elevation of the wireless terminal to a location-based application server.

3. The method of claim 1 wherein the first probability distribution of pressure measurement bias is further defined by (i) a first uncertainty that characterizes an exponential decay from the first estimate of bias toward a first end of the first probability distribution, and (ii) a second uncertainty that characterizes an exponential decay from the second estimate of bias toward a second end of the first probability distribution.

4. The method of claim 1 wherein the data points are defined by a normal distribution along a horizontal dimension, and wherein the first estimate of location comprises a first geographical coordinate whose value defines the mean of the normal distribution.

5. The method of claim 1 wherein the estimate of the elevation of the wireless terminal is further based on an average of (i) the first estimate of bias and (ii) the second estimate of bias.

6. The method of claim 1 further comprising:
receiving, by the data processing system, a series of prior measurements of barometric pressure at the wireless terminal made prior to the first measurement of barometric pressure at the wireless terminal;
generating, by the data processing system, a second probability distribution of pressure measurement bias defined by:
  (i) a lower estimate of bias of barometric pressure measured by the wireless terminal, wherein the lower estimate of bias is based on the series of prior measurements of barometric pressure, and
  (ii) an upper estimate of bias of barometric pressure measured by the wireless terminal, wherein the upper estimate of bias is based on the series of prior measurements of barometric pressure; and
generating, by the data processing system, an updated probability distribution of pressure measurement bias, based on combining mathematically the first probability distribution and the second probability distribution;
wherein the estimate of the elevation of the wireless terminal is further based on the updated probability distribution of pressure measurement bias.

7. A method of estimating the elevation of a wireless terminal, the method comprising:
receiving, by a data processing system, a series of measurements of barometric pressure at the wireless terminal;
generating, by the data processing system, a first probability distribution of pressure measurement bias, based on the series of measurements of barometric pressure at the wireless terminal;

receiving, by a data processing system, a first estimate of location of a wireless terminal;

receiving, by the data processing system, a first measurement of barometric pressure at the wireless terminal;

generating, by the data processing system, data points in a nonempty first set of data points in space based on the first estimate of location of the wireless terminal, wherein the data points correspond to geographical coordinates;

generating, by the data processing system, a second probability distribution of pressure measurement bias defined by:
  (i) a first estimate of bias of barometric pressure measured by the wireless terminal, wherein the first estimate of bias is based on (a) a first data point whose geographical coordinates are at the lowest elevation in the first set of data points, and (b) the first measurement of barometric pressure at the wireless terminal, and
  (ii) a second estimate of bias of barometric pressure measured by the wireless terminal, wherein the second estimate of bias is based on (a) a second data point whose geographical coordinates are at the highest elevation in the first set of data points, and (b) the first measurement of barometric pressure at the wireless terminal;

receiving, by the data processing system, a second measurement of barometric pressure at the wireless terminal; and generating, by the data processing system, an estimate of the elevation of the wireless terminal based on (a) the second measurement of barometric pressure at the wireless terminal, (b) the first probability distribution of pressure measurement bias, and (c) the second probability distribution of pressure measurement bias.

8. The method of claim 7 further comprising transmitting the estimate of elevation of the wireless terminal to a location-based application server.

9. The method of claim 7 wherein the first estimate of location of the wireless terminal comprises geographical coordinates in two horizontal dimensions.

10. The method of claim 7 wherein the second probability distribution of pressure measurement bias is further defined by (i) a first uncertainty that characterizes an exponential decay from the first estimate of bias toward a first end of the second probability distribution, and (ii) a second uncertainty that characterizes an exponential decay from the second estimate of bias toward a second end of the second probability distribution.

11. The method of claim 7 wherein the data points are defined by a normal distribution along a horizontal dimension, and wherein the first estimate of location comprises a first geographical coordinate whose value defines the mean of the normal distribution.

12. The method of claim 11, further comprising receiving an uncertainty in the first estimate of location of the wireless terminal, wherein a horizontal component of the uncertainty in the first estimate of location defines the standard deviation of the normal distribution.

13. The method of claim 7 further comprising combining mathematically the first and second probability distributions of pressure measurement bias, resulting in an updated probability distribution of pressure measurement bias defined by (i) a lower estimate of bias of barometric pressure measured by the wireless terminal and (ii) an upper estimate of bias of barometric pressure measured by the wireless terminal, wherein the updated probability distribution is flat between the lower and upper estimates of bias.

14. The method of claim 13 wherein the estimate of the elevation of the wireless terminal is further based on an average of (i) the lower estimate of bias of barometric pressure measured by the wireless terminal and (ii) the upper estimate of bias of barometric pressure measured by the wireless terminal.

15. A method of estimating the elevation of a wireless terminal, the method comprising:
   receiving, by a data processing system, a first estimate of location of a wireless terminal, the first estimate comprising i) a first geographic coordinate value along a first horizontal dimension and ii) a second geographic coordinate value along a second horizontal dimension;
   receiving, by the data processing system, a first measurement of barometric pressure at the wireless terminal;
   generating, by the data processing system, data points in a nonempty first set of data points in space, based on i) a first normal distribution that is defined by the first geographic coordinate value and ii) a second normal distribution that is defined by the second geographic coordinate value, wherein the data points in the first set are represented by coordinate values along the first and second horizontal dimensions;
   generating, by the data processing system:
      (i) a first estimate of bias of barometric pressure measured by the wireless terminal, based on (a) a first data point whose geographical coordinates are at the lowest elevation in the first set of data points, and (b) the first measurement of barometric pressure at the wireless terminal, and
      (ii) a second estimate of bias of barometric pressure measured by the wireless terminal, based on (a) a second data point whose geographical coordinates are at the highest elevation in the first set of data points, and (b) the first measurement of barometric pressure at the wireless terminal;
   receiving, by the data processing system, a second measurement of barometric pressure at the wireless terminal; and
   generating, by the data processing system, an estimate of the elevation of the wireless terminal based on (a) the second measurement of barometric pressure at the wireless terminal, (b) the first estimate of bias, and (c) the second estimate of bias.

16. The method of claim 15 further comprising transmitting the estimate of elevation of the wireless terminal to a location-based application server.

17. The method of claim 15 wherein the first estimate of location further comprises an uncertainty in the first geographic coordinate value, wherein at least one of the first normal distribution and the second normal distribution is further defined by the uncertainty in the first geographic coordinate value.

18. The method of claim 17 wherein the first coordinate value defines the mean of the first normal distribution, and wherein the uncertainty in the first geographic coordinate value defines the standard deviation of the first normal distribution.

19. The method of claim 15 wherein the estimate of the elevation of the wireless terminal is further based on an average of (i) the first estimate of bias and (ii) the second estimate of bias.

20. The method of claim 15, further comprising:
   defining a first probability distribution of pressure measurement bias by (i) the first estimate of bias of barometric pressure measured by the wireless terminal and (ii) the second estimate of bias of barometric pressure measured by the wireless terminal, wherein the first probability distribution is flat between the first and second estimates of bias;
   receiving, by the data processing system, a series of prior measurements of barometric pressure at the wireless terminal made prior to the first measurement of barometric pressure at the wireless terminal; and
   combining mathematically the first probability distribution of pressure measurement bias and a second probability distribution of pressure measurement bias, wherein the second probability distribution is based the series of prior measurements of barometric pressure.

* * * * *